(12) United States Patent
Bacque et al.

(10) Patent No.: US 9,812,863 B2
(45) Date of Patent: Nov. 7, 2017

(54) DISTRIBUTED ELECTRICAL MICROGRID CONTROL

(71) Applicant: Solantro Semiconductor Corp., Ottawa (CA)

(72) Inventors: James Benson Bacque, Ottawa (CA); Raymond Kenneth Orr, Kanata (CA); Edward Patrick Keyes, Ottawa (CA)

(73) Assignee: SOLANTRO SEMICONDUCTOR CORP. (CA)

( * ) Notice: Subject to any disclaimer, the term of this patent is extended or adjusted under 35 U.S.C. 154(b) by 339 days.

(21) Appl. No.: 14/574,827

(22) Filed: Dec. 18, 2014

(65) Prior Publication Data

US 2016/0179116 A1    Jun. 23, 2016

(51) Int. Cl.
*H02J 3/18*  (2006.01)
*G05F 1/625*  (2006.01)
*H02J 3/24*  (2006.01)

(52) U.S. Cl.
CPC ............... *H02J 3/18* (2013.01); *G05F 1/625* (2013.01); *H02J 3/24* (2013.01)

(58) Field of Classification Search
CPC ....... G05F 1/625; H02J 2003/388; H02J 3/00; H02J 3/32; H02J 3/381; H02J 3/382; H02J 3/383; H02J 3/386; H02J 9/066; H02J 3/38; H02M 5/04; Y02B 10/72; Y02B 70/322
USPC ........................................................ 700/298
See application file for complete search history.

(56) References Cited

U.S. PATENT DOCUMENTS

| | | | | |
|---|---|---|---|---|
| 4,499,533 A | * | 2/1985 | Okamoto | H02M 1/14 307/11 |
| 6,028,263 A | * | 2/2000 | Kobayashi | H01L 35/00 136/201 |
| 9,026,260 B1 | * | 5/2015 | Thornley | H02J 3/00 700/292 |

(Continued)

OTHER PUBLICATIONS

Karlsson et al., "Stability of Voltage and Frequency Control in Distributed Generation Based on Parallel-Connected Converters Feeding Constant Power Loads", European Conference on Power Electronics and Applications, EPE 2005, pp. 1-10.

(Continued)

*Primary Examiner* — Thomas Lee
*Assistant Examiner* — Santosh R Poudel
(74) *Attorney, Agent, or Firm* — Barnes & Thornburg LLP

(57) ABSTRACT

An electrical power source includes a power converter and either an electrical generator or an electrical energy storage device. Power flow is controlled through control of the power converter based on a voltage source and resistance model of the electrical power source. A power converter for an electrical generator is controlled to synthesize a constant voltage of the voltage source and a variable value of the resistance. The resistance value is controlled to deliver a maximum available output power to the electrical microgrid over a range of microgrid voltages up to a voltage below a maximum allowable voltage of the electrical microgrid. For an electrical energy storage device, the power converter is controlled to synthesize a resistance value of the resistance that is dependent upon a phase angle between the voltage at the microgrid side of the electrical power source and current of the electrical energy storage device.

29 Claims, 18 Drawing Sheets

(56) References Cited

U.S. PATENT DOCUMENTS

| | | | | |
|---|---|---|---|---|
| 2009/0289637 A1* | 11/2009 | Radtke | ............ | G01R 27/16 |
| | | | | 324/629 |
| 2011/0095609 A1* | 4/2011 | Cardinal | ............ | H02J 3/24 |
| | | | | 307/43 |
| 2012/0083935 A1* | 4/2012 | Wells | ............ | H02J 3/381 |
| | | | | 700/292 |
| 2014/0129042 A1* | 5/2014 | Miner | ............ | G05B 13/02 |
| | | | | 700/296 |
| 2014/0188300 A1* | 7/2014 | Nguyen | ............ | H02J 3/46 |
| | | | | 700/297 |
| 2014/0292259 A1* | 10/2014 | Kim | ............ | H02J 7/00 |
| | | | | 320/107 |
| 2015/0022007 A1* | 1/2015 | Ma | ............ | H02J 3/386 |
| | | | | 307/84 |
| 2015/0051750 A1* | 2/2015 | Kurs | ............ | G05F 1/625 |
| | | | | 700/298 |
| 2016/0329713 A1* | 11/2016 | Berard | ............ | H02J 3/24 |

OTHER PUBLICATIONS

Vandoorn et al., "Automatic Power Sharing Modification of P/V Droop Controllers in Low-Voltage Resistive Microgrids", IEEE Transactions on Power Delivery, vol. 27, Issue 4, Oct. 2012, nine pages.

Guerrero et al., "Output Impedance Design of Parallel-Connected UPS Inverters With Wireless Load-Sharing Control", IEEE Transactions on Industrial Electronics, vol. 52, No. 4, Aug. 2005, pp. 1126-1135.

* cited by examiner

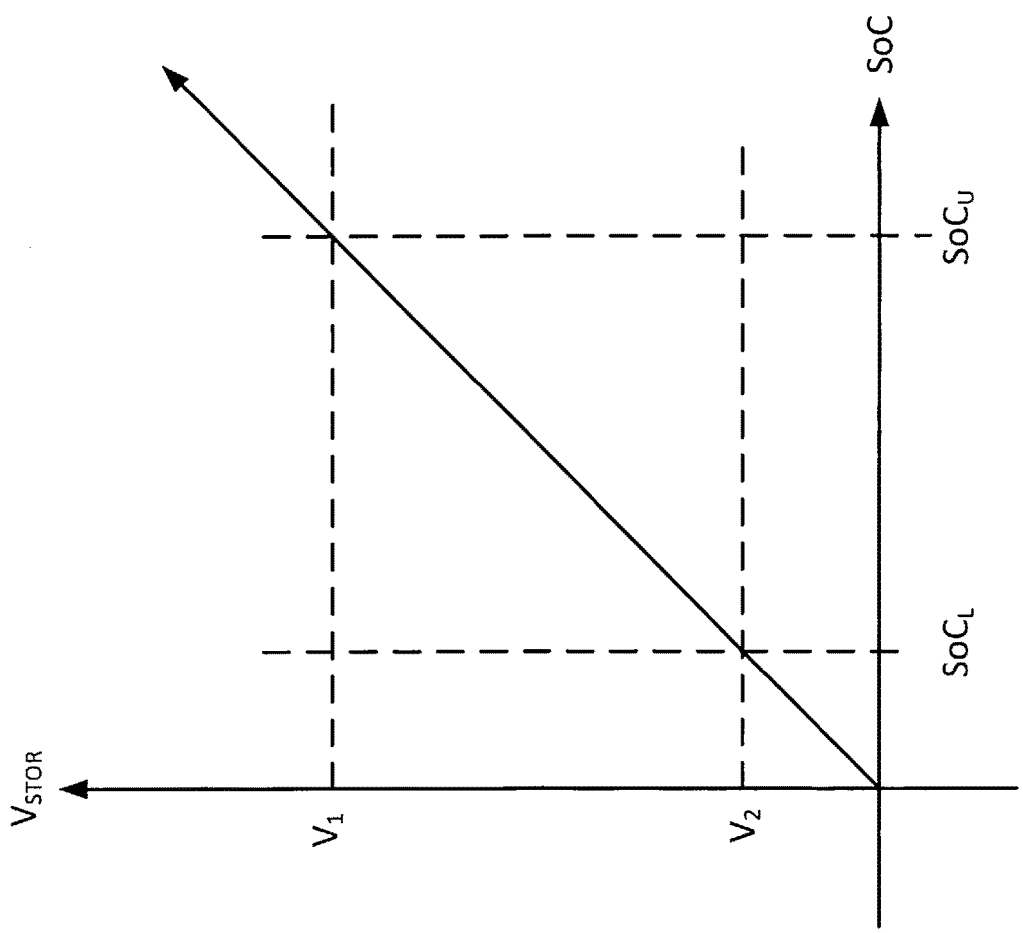

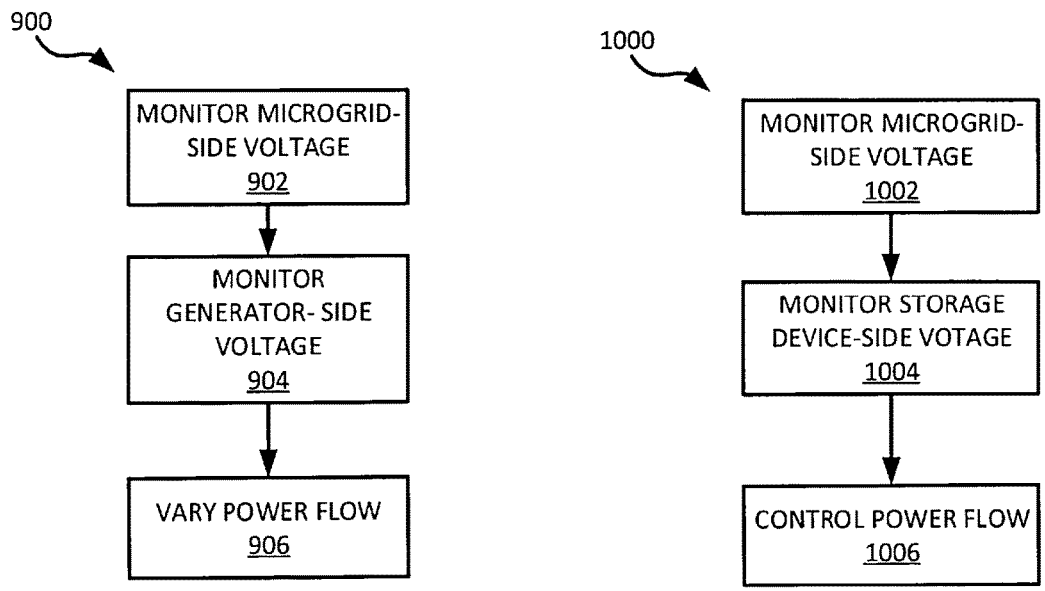
FIG. 9
FIG. 10
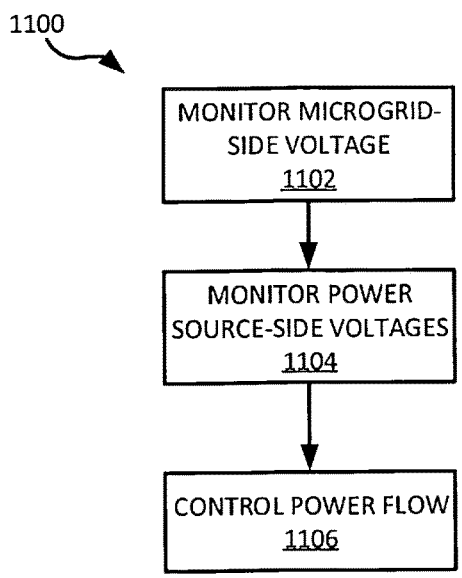
FIG. 11

DISTRIBUTED ELECTRICAL MICROGRID CONTROL

TECHNICAL FIELD

Embodiments herein generally relate to the control of electrical networks, and more specifically to the control of electrical networks comprising distributed generation and storage.

BACKGROUND

Electrical networks using small, distributed generators, commonly referred to as microgrids, are becoming a popular way to provide electrical power. Applications for microgrids include remote locations such as mining camps or military forward operating bases, disaster relief situations and in the developing world where the utility grid is unreliable or non-existent. Applications within the developed world also exist, especially in conjunction with the use of renewable power generators such as wind or solar power.

Microgrids could use renewable power generators such as wind turbines or solar photovoltaic (PV) panels but could also or instead use non-renewable generation such as diesel or gas turbine generators. Microgrids could also use electrical storage devices such as, for example, batteries or fuel cells to provide power during periods when generating capacity cannot meet the electrical demand. Storage could be especially useful when a significant portion of the microgrid's generation is from renewable sources whose power output has significant daily variation. Microgrids can be connected to an existing utility grid or they may be completely off grid.

SUMMARY

A method includes: monitoring voltage at a microgrid side of an electrical power source in an electrical microgrid, the electrical power source including an electrical generator and a power converter coupled to the electrical generator at the microgrid side of the electrical generator, the electrical generator having a variable maximum available output power; monitoring voltage at an electrical generator side of the power converter of the electrical power source; varying power flow between the microgrid and the electrical power source by controlling the power converter to synthesize, in a voltage source and resistance model of the electrical power source, a constant voltage of the voltage source and a variable value of the resistance. Controlling the power converter involves controlling the value of the resistance to deliver the maximum available output power to the electrical microgrid over a range of microgrid voltages up to a first voltage $V_{MAX1}$ below a maximum allowable voltage $V_{MAX}$ of the electrical microgrid.

The constant voltage could be the maximum allowable voltage $V_{MAX}$ of the electrical microgrid.

Controlling the power converter could further involve controlling the power converter to provide power output to the electrical microgrid by varying the resistance value of the resistance according to $$R_{GEN} = \frac{V_{GRID}\cos\emptyset}{P_{MPP}}\left[V_{MAX}^2 + V_{GRID}^2 - 2V_{GRID}V_{MAX}\left\{\cos(\emptyset)\sqrt{1-K'^2\sin^2\emptyset} + K'\sin^2(\emptyset)\right\}\right]^{1/2}$$

where $R_{GEN}$ is the resistance value;
$V_{GRID}$ is a voltage of the electrical microgrid;
$\emptyset$ is a phase angle between the voltage at the microgrid side of the electrical power source and output current of the electrical power source;
$P_{MPP}$ is the maximum available output power from the electrical generator to the electrical microgrid;
$V_{MAX}$ is also the constant voltage of the voltage source;

$K'=V_{GRID}/V_{MAX}$.

Controlling the power converter could also include controlling the power converter to provide power output to the electrical microgrid that monotonically decreases with microgrid voltage to zero power output at the voltage $V_{MAX}$.

Another method involves: monitoring voltage at a microgrid side of an electrical power source in an electrical microgrid, the electrical power source including an electrical energy storage device and a power converter coupled to the electrical energy storage device at the microgrid side of the electrical energy storage device; monitoring voltage at an electrical energy storage device side of the power converter of the electrical power source; controlling power flow between the microgrid and the electrical power source by controlling the power converter to synthesize, in a voltage source and resistance model of the electrical power source, a resistance value of the resistance that is dependent upon a phase angle between the voltage at the microgrid side of the electrical power source and current of the electrical power source.

Controlling the power converter could involve controlling the power converter to synthesize the resistance value as $R_{STOR}$:

$$R_{STOR} = \frac{V_{MIN2}\cos\emptyset}{P_{S,MAX}}\left[V_{MIN2}^2 + V_{MIN1}^2 - 2V_{MIN1}V_{MIN2}\left\{\cos(\emptyset)\sqrt{1-K'''^2\sin^2\emptyset} + K'''\sin^2(\emptyset)\right\}\right]^{1/2}$$

where $V_{MIN1}$ and $V_{MIN2}$ are threshold operating voltages of the electrical microgrid and are less than a nominal operating voltage of the electrical microgrid and $V_{MIN1} > V_{MIN2}$;
$\emptyset$ is a phase angle between the voltage at the microgrid side of the electrical power source and current of the electrical power source;
$P_{S,MAX}$ is maximum real output power of the electrical energy storage device;

$K'''=V_{MIN2}/V_{MIN1}$.

Controlling the power converter could involve controlling the power converter to synthesize, for a purely resistive microgrid, the resistance value as $R_{STOR}$:

$$R_{STOR} = \frac{V_{MIN2} \cdot V_{MIN1} - V_{MIN2}^2}{P_{S,MAX}}$$

where $V_{MIN1}$ and $V_{MIN2}$ are threshold operating voltages of the electrical microgrid and are less than a nominal operating voltage of the electrical microgrid and $V_{MIN1} > V_{MIN2}$;

$P_{S,MAX}$ is maximum real output power of the electrical energy storage device.

In another embodiment, controlling the power converter involves controlling a voltage of the voltage source differently depending on whether the electrical energy storage device is to charge or discharge.

For example, controlling the power converter could involve controlling the voltage of the voltage source so that power is supplied from the electrical energy storage device to the electrical microgrid when a voltage of the electrical microgrid $V_{GRID}$ is less than a nominal voltage $V_{NOM}$, and power is supplied to the electrical energy storage device from the electrical microgrid when $V_{GRID} > V_{NOM}$.

$V_{GRID}$ could thereby provide an output power status of the electrical energy storage device.

Controlling the power converter could involve controlling the voltage of the voltage source based on a state of charge of the electrical energy storage device, with a dependence of the voltage of the voltage source monotonically increasing with the state of charge between an upper limit and a lower limit.

In another embodiment, controlling the power converter involves controlling a voltage of the voltage source to track the voltage at the microgrid side of the electrical power source after a maximum value of output power from the electrical energy storage device is reached.

Controlling the power converter could involve controlling the voltage of the voltage source based on a state of charge of the electrical energy storage device, with a dependence of power output from the electrical energy storage device to the electrical microgrid monotonically increasing with the state of charge.

A method could also include monitoring a state of charge of the electrical energy storage device, in which case controlling the power converter could involve controlling the power converter to synthesize the resistance value of the resistance dependent upon the phase angle while the state of charge is above a threshold state of charge, and controlling the power converter to decrease power output from the electrical energy storage device to the electrical microgrid by increasing the resistance value of the resistance when the state of charge is at or below the threshold state of charge.

Controlling the power converter could involve controlling charging of the electrical energy storage device by controlling a voltage of the voltage source to be below a voltage of the electrical microgrid. In an embodiment, controlling the power converter involves controlling the voltage of the voltage source to be below the voltage of the electrical microgrid according to $$V_{STOR} = \frac{P_{TAR} \cdot R_{STOR} + V_{GRID}^2}{V_{GRID}}$$

where $V_{STOR}$ is the voltage of the voltage source;
$P_{TAR}$ is target charging power, and negative for charging;
$R_{STOR}$ is an resistance value of the resistance;
$V_{GRID}$ is the voltage of the electrical microgrid.

Controlling the power converter could involve providing zero power flow between the electrical energy storage device and the electrical microgrid by controlling a voltage of the voltage source to track a voltage of the electrical microgrid.

Controlling the power converter could involve controlling charging of the electrical energy storage device by controlling the voltage of the voltage source to be below the voltage of the electrical microgrid but above a minimum voltage.

In another embodiment, controlling the power converter involves controlling a power output of the electrical power source by controlling the voltage of the voltage source to be above a minimum voltage and above a voltage of the electrical microgrid.

Controlling the power converter could involve controlling the power converter to provide asymmetric transition times for the electrical energy storage device to transition from charging to discharging and to transition from discharging to charging.

A method could also involve detecting a power oversupply condition in the electrical microgrid where the monitored voltage at the microgrid side of the electrical power source is above a threshold, in which case controlling power flow could involve controlling the electrical energy storage device to store electrical energy from the electrical microgrid responsive to detecting the power oversupply condition.

Another method includes: monitoring voltages at a microgrid side of a plurality of electrical power sources in an electrical microgrid, each of the electrical power sources including a power source device and a power converter coupled to the power source device at the microgrid side of the electrical power source; monitoring voltages at a power source device side of the power converter of each of the electrical power sources; controlling power flow between the microgrid and each of the electrical power sources by controlling the power converters. The controlling involves, for an electrical power source that includes an electrical generator as the power source device, controlling the power converter of the electrical power source to maintain, in a voltage source and resistance model of the electrical power source, a constant voltage of the voltage source; and, for an electrical power source that includes an electrical energy storage device as the power source device, controlling the power converter of the electrical power source to synthesize, in a voltage source and resistance model of the electrical power source, a resistance value of the resistance that is dependent upon a phase angle between the voltage at the microgrid side of the electrical power source and current of the electrical power source.

The method could also include controlling loads in the electrical migrogrid based on one or more of: priorities respectively associated with the loads, storability of the loads, and states of the electrical power sources.

In an embodiment, a method also involves: monitoring voltage of the electrical microgrid at the loads; determining, at the loads, the states of the electrical power sources based on the voltage.

Another embodiment also includes detecting a power oversupply condition in the electrical microgrid where the monitored voltages are above a threshold.

A method could involve starting the loads on the electrical microgrid responsive to detecting the power oversupply condition.

A method could also include detecting a generation to storage charging and load equilibrium condition in the electrical microgrid where the monitored voltages are above a lower threshold and below an upper threshold.

In an embodiment, a method also involves detecting a storage discharge condition in the electrical microgrid where the monitored voltages decrease below a threshold. A method could then include controlling a load to deactivate the load or to prevent the load from starting on the electrical microgrid responsive to detecting the storage discharge condition.

Controlling loads could involve controlling the loads based on the voltage of the electrical microgrid, to disconnect each load from the electrical microgrid following a respective disconnect time delay for the load after the voltage of the electrical microgrid decreases to a respective disconnect threshold voltage for the load. The disconnect time delay for each load could be proportional to a difference between the disconnect threshold voltage of the load and a nominal operating voltage of the electrical microgrid.

Controlling loads could involve controlling the loads based on the voltage of the electrical microgrid, to connect each load to the electrical microgrid following a respective connect time delay for the load after the voltage of the electrical microgrid increases to a respective connect threshold voltage for the load. The connect time delay for a first load that has a higher priority than a second load could be shorter than the connect time delay for the second load.

In an embodiment, controlling loads involves controlling the loads based on the voltage of the electrical microgrid, to connect each load to the electrical microgrid following a respective connect time delay for the load after the voltage of the electrical microgrid increases to a respective connect threshold voltage for the load. The connect time delay for each load could be proportional to a difference between the connect threshold voltage of the load and a minimum operating voltage of the electrical microgrid.

Controlling loads could involve controlling the loads based on the voltage of the electrical microgrid, to disconnect each load from the electrical microgrid following a respective disconnect time delay for the load after the voltage of the electrical microgrid decreases to a respective disconnect threshold voltage for the load, and to reconnect each load to the electrical microgrid following a respective reconnect time delay for the load after the voltage of the electrical microgrid increases to a respective reconnect threshold voltage for the load. The disconnect time delays and the reconnect time delays could be based on the priorities respectively associated with the loads. A method could also include randomizing the disconnect time delays and the reconnect time delays for loads of equal priority.

BRIEF DESCRIPTION OF THE DRAWINGS

FIG. 5A is a graphical illustration of an example relationship between a Root Mean Square (RMS) source voltage ($V_{STOR}$) and State of Charge (SoC) of an electrical energy storage appliance.

FIG. 9 is a flow diagram illustrating an example method.

FIG. 10 is a flow diagram illustrating another example method.

FIG. 11 is a flow diagram illustrating a further example method.

DETAILED DESCRIPTION

Figure 1A:
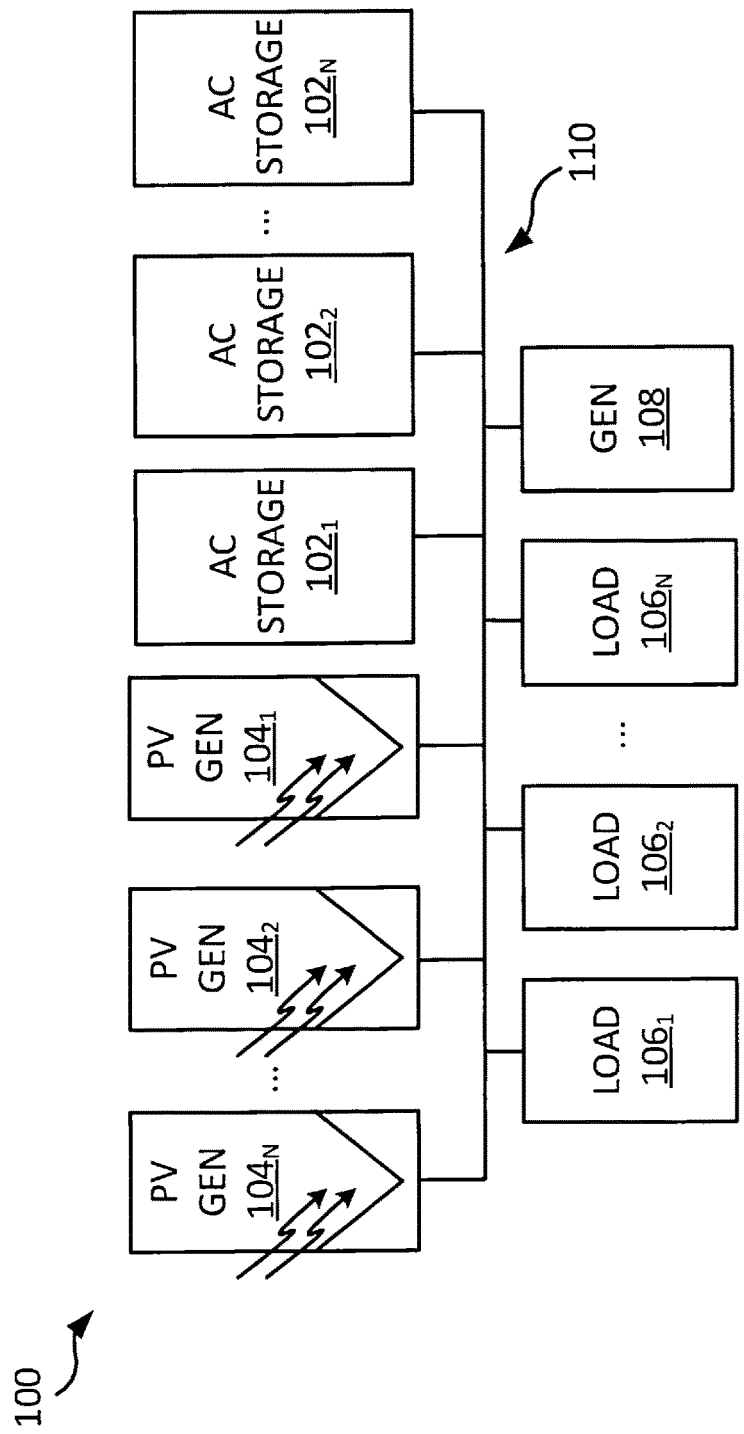
FIG. 1A is a block diagram of an example microgrid.

Referring now to the drawings, where similar reference characters denote corresponding features consistently throughout the figures, example embodiments will be described.

As used herein, "power type" means electrical power that can be either Direct Current (DC) power, single phase Alternating Current (AC) power, or three phase AC power, where in the case of AC power the power could be real power, reactive (inductive or capacitive) power or a combination of real and reactive power.

Electrical Microgrids

A potential weakness of microgrids is that sudden large changes in loading or power generation could cause the microgrid to become unstable. This could result in power outages or damage to microgrid connected generators and loads. Stable operation during load and generation changes could be provided by a microgrid control system. Microgrid frequency and voltage could be kept within safe limits while providing an efficient and reliable electrical supply. Ideally, a microgrids should be scalable and easily constructed, allowing for the convenient addition of incremental generation and loads. Such features could be provided in a microgrid control system that is based on distributed rather than centralized control.

FIG. 1A is a block diagram of an example microgrid. Microgrid 100 comprises distributed AC storage appliances $102_1$, $102_2$ ... $102_N$, distributed AC photovoltaic (PV) generators $104_1$, $104_2$, ... $104_N$; loads $106_1$, $106_2$ ... $106_N$, and non-renewable AC generator 108 connected to power bus 110. The AC storage appliances $102_1$, $102_2$ ... $102_N$ and AC PV generators $104_1$, $104_2$, ... $104_N$ are examples of electrical power sources. It should be noted that a microgrid need not include the same number of storage appliances, generators, and loads, and that "N" could have different values in different drawings and/or different values in connection with different components in any one drawing.

Microgrid 100 could be a single phase or multi-phase microgrid. AC PV generators $104_1$, $104_2$, ... $104_N$ produce AC power. They comprise PV cells which convert light into DC power and an inverter which converts the DC power to AC. The PV cells and inverters have not been shown for simplicity of the drawing. AC PV generators $104_1$, $104_2$, ... $104_N$ could each comprise a single PV panel that includes PV cells or multiple PV panels that each include PV cells.

AC Storage appliances $102_1$, $102_2$ ... $102_N$ can both provide power to the microgrid (discharge) and take power from the microgrid (charge). AC Storage appliances $102_1$, $102_2$ ... $102_N$ could be any type of electrical storage appliance and could include any one or more of fuel cells, flywheels, super capacitors and AC batteries. Storage appliances $102_1$, $102_2$ ... $102_N$ could be all of one storage type or could include a combination of different storage types. AC batteries comprise a DC battery that stores DC power and a bi-directional inverter that can convert DC power to AC and can also convert AC power to DC to charge the battery. Various types of DC batteries are possible including lead acid, lithium ion or nickel cadmium, for example.

Generator 108 also supplies power to the microgrid and could be, for example, a non-renewable generator such as a diesel generator or a gas turbine.

Various safety elements have been omitted from microgrid 100 for simplicity of the drawing. These might include circuit breakers, disconnect switches, fuses and/or distribution boxes. Microgrid 100 is an example microgrid only and other types of microgrid are possible. For example, microgrid 100 is an AC microgrid but a DC microgrid is also possible. Microgrid 100 is shown as having a single power bus 110 and with all of the loads $106_1$, $106_2$ ... $106_N$, AC PV generators $104_1$, $104_2$ ... $104_N$, generator 108 and AC storage appliances $102_1$, $102_2$ ... $102_N$ connected to it. However, other microgrid topologies are also possible including multiple power buses or mesh type topologies.

Figure 1B:
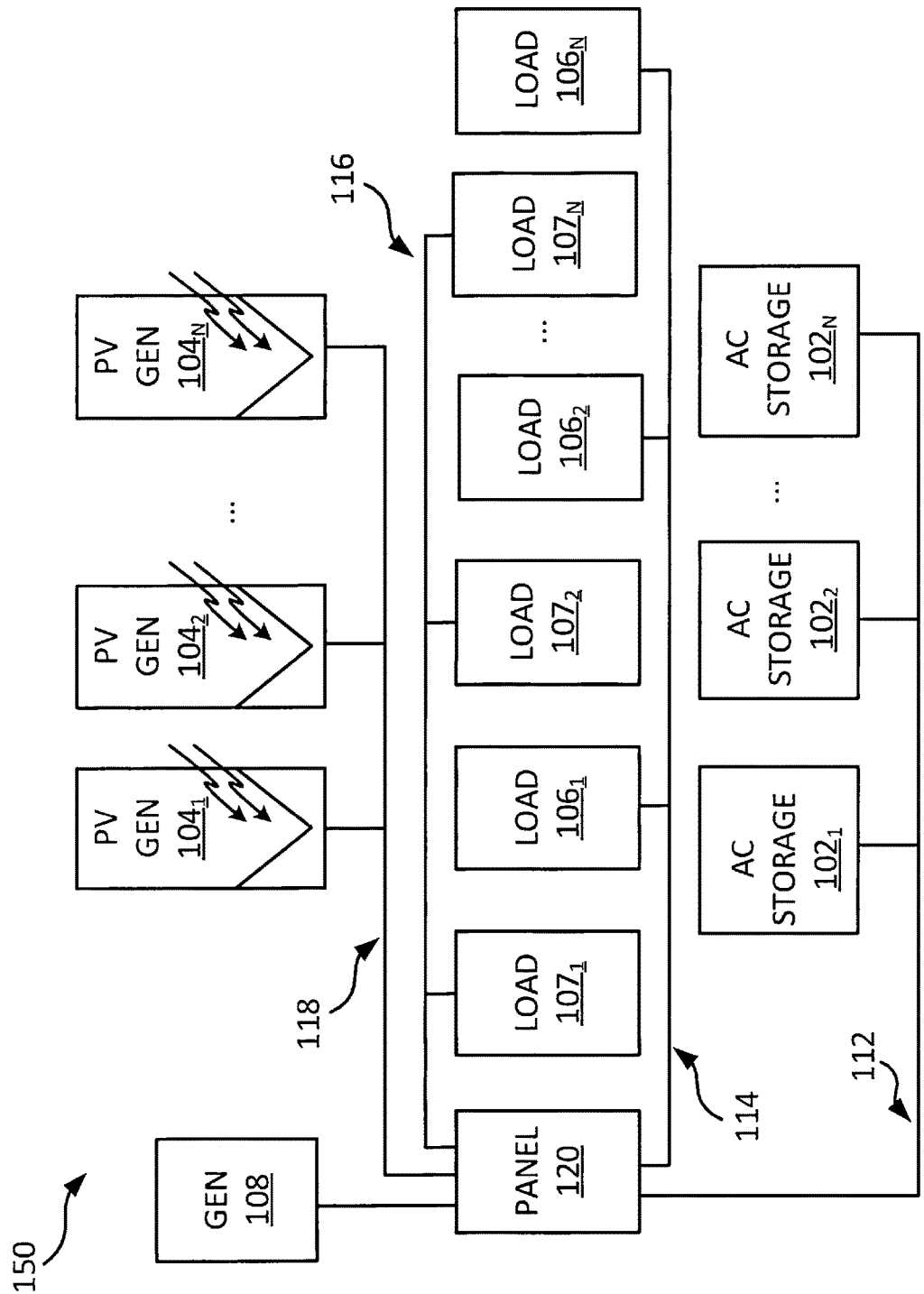
FIG. 1B is a block diagram of an example of a microgrid with four power buses.

FIG. 1B is a block diagram of an example of a microgrid with four power buses. Microgrid 150 comprises power buses 112, 114, 116, 118 connected through distribution panel 120. AC PV generators $104_1$, $104_2$ ... $104_N$ connect to power bus 118. AC storage appliances $102_1$, $102_2$, ... $102_N$ connect to power bus 112. Loads $106_1$, $106_2$ ... $106_N$ connect to power bus 114 and loads $107_1$, $107_2$ ... $107_N$ connect to power bus 116. Generator 108 also supplies power to the microgrid and could be, for example, a non-renewable generator such as diesel or a gas turbine. Distribution panel 120 provides connectivity between power buses 112, 114, 116, 118 and could contain relays, circuit breakers, fuses or other safety devices to isolate an individual power bus from the microgrid and remaining power buses in the event of an electrical fault on that bus. Distribution panel 120 could, for example, be an intelligent distribution panel as described in International application PCT/CA2014/050111 "SELF FORMING MICROGRIDS", incorporated in its entirety herein by reference, and could comprise switching and voltage and current monitoring means for monitoring and switching power buses 112, 114, 116, 118. This topology could be helpful to support fault isolation, safety and/or load shedding.

Figure 1C:
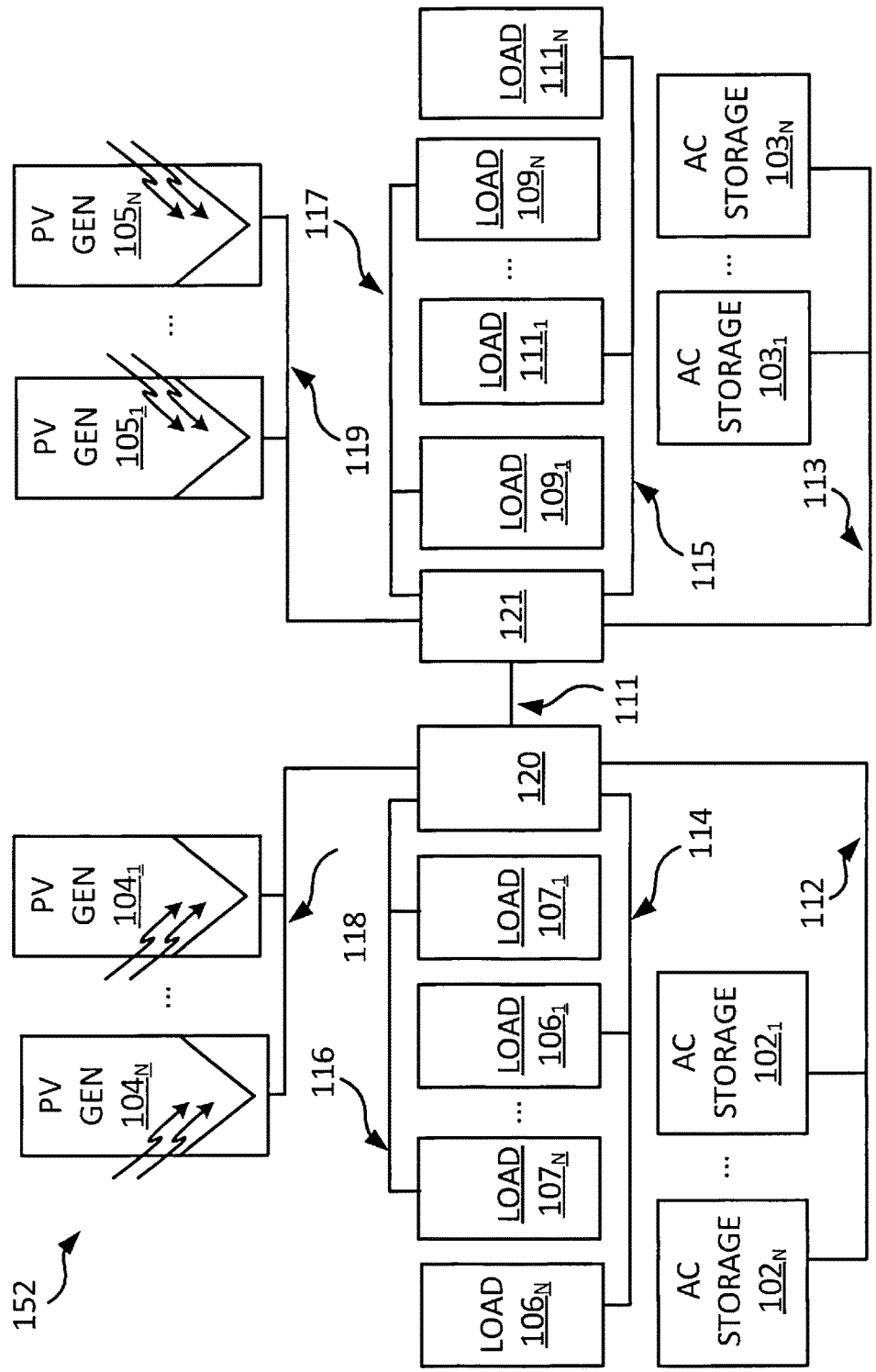
FIG. 1C is a block diagram of another example microgrid.

FIG. 1C is a block diagram of another example microgrid. Microgrid 152 comprises distribution panels 120 and 121 connected by power bus 111. Power buses 112, 114, 116, 118 connect through distribution panel 120 and power buses 113, 115, 117, 119 connect through distribution panel 121. AC PV generators $104_1$, ... $104_N$ connect to power bus 118 and AC PV generators $105_1$ ... $105_N$ connect to power bus 119. AC storage appliances $102_1$, ... $102_N$ connect to power bus 112 and AC storage appliances $103_1$, ... $103_N$ connect to power bus 113. Loads $106_1$ ... $106_N$ connect to power bus 114 and loads $107_1$ ... $107_N$ connect to power bus 116. Loads $111_1$ ... $111_N$ connect to power bus 115 and loads $109_1$ ... $109_N$ connect to power bus 117. Each distribution panel 120 and 121 could be an intelligent distribution panel as described in the above-referenced International application PCT/CA2014/050111, and could comprise switching means and voltage and current monitoring means for monitoring and switching power buses 112, 114, 116, 118 and power buses 113, 115, 117, 119. Microgrids are not restricted to the preceding examples and in general, a microgrid could comprise a plurality of interconnected distribution panels, each distribution panel connected to its own network that could include any or all of loads, storage appliances and/or generators.

Microgrid connected generators (PV or otherwise) and AC storage appliances could be controlled in a variety of ways. In some microgrids, on a particular time scale or above a particular response frequency generators are controlled to be current sources and source current at the prevailing microgrid voltage. The current could be controlled to vary in a sinusoidal fashion. On a longer time scale or below this response frequency the generators are controlled to be constant power sources and supply a constant amount of power to the microgrid at the microgrid voltage. The response frequency could be determined by the microgrid line frequency and could be the line frequency. For example, if the microgrid had a line frequency of 60 Hz the response frequency might be 60 Hz.

For example, across a single period of the line voltage an inverter in an AC storage appliance $102_1$, $102_2$ ... $102_N$ or an AC PV generator $104_1$, $104_2$, ... $104_N$ could act as a constant current source and source a sinusoidally varying current with a Root Mean Square (RMS) value of $I_i$ at the microgrid RMS voltage $V_{GRID}$. After every line period however the inverter could respond to a change in the RMS value of the microgrid voltage and change the amount of current delivered for the next period such that the amount of power delivered in the next period is the same as the previous period. For example, for a constant amount of apparent power "$S_{GEN}$" the RMS current to be delivered on the next period ($I_{i+1}$) into a microgrid with an RMS voltage of $V_{GRID}$ would be $$I_{i+1} = \frac{S_{GEN}}{V_{GRID}}$$

A microgrid using this kind of generator control can have difficulty handling electrical transients that are faster than the microgrid's frequency or higher order harmonics of the microgrid frequency. For example, the start-up of a large load such as a motor could cause a sudden drop in the microgrid's impedance. Under these circumstances it would be desirable for a generator or AC storage appliance to immediately increase its power output to the microgrid to maintain the microgrid voltage above its safe minimum and not wait for the next microgrid period.

The apparent power into a microgrid of impedance $Z_{GRID}$ from a constant current generator of current $I_{GEN}$ is however $$S_{GEN} = I_{GEN}^2 Z_{GRID}$$

If $Z_{GRID}$ decreases then $S_{GEN}$ also decreases. Thus, a constant current generator will actually reduce the amount of power it supplies to the microgrid when $Z_{GRID}$ suddenly drops and will not support the microgrid voltage. The generator might only respond with more power on the time scale of its constant power operation which could be the microgrid period. Conversely, for a sharp rise in $Z_{GRID}$, from the turn off of a large load for example, it would be preferable for the generator to immediately reduce its output power to maintain $V_{GRID}$ below a safe maximum value. A constant current controlled generator will however, actually increase the amount of power it delivers to the microgrid when $Z_{GRID}$ increases.

A constant current/constant power control method can also have difficulty handling lower frequency events on the microgrid. For example, the microgrid's impedance ($Z_{GRID}$) may gradually increase due to its electrical storage appliances becoming fully charged, in which case the microgrid voltage will rise. Under these circumstances it would be desirable for a generator to reduce its output power to prevent the microgrid voltage rising above a maximum safe value. At frequencies lower than the microgrid frequency however, the generator power ($S_{GEN}$) is controlled to be constant. The microgrid voltage is $$V_{GRID} = \sqrt{Z_{GRID} S_{GEN}}$$

If $S_{GEN}$ is held constant then as $Z_{GRID}$ increases the generator will cause $V_{GRID}$ to also increase. Thus, a constant power controlled generator could cause the microgrid voltage to rise above a safe operating value.

A microgrid generator control model could include a synthesized voltage source of a fixed voltage that is higher than nominal microgrid voltage, in a circuit path with a synthesized output resistance. A microgrid generator controller controls generator output power by adjusting the value of the synthetic output resistance while keeping the synthesized RMS source voltage ($V_{GEN}$) constant. The output voltage of the generator varies as function of its real output power.

A microgrid control model as disclosed herein could provide generators and electrical storage appliances with different effective or synthetic electrical properties.

From the theory of source transformations, the series combination of a voltage source and a resistance as described above is electrically equivalent to the parallel combination of a current source and the same resistance. Therefore, a microgrid generator control model as disclosed herein could comprise a synthesized current source coupled across a synthesized output resistance, and a microgrid generator controller could control generator output power primarily by adjusting the value of the synthesised resistance $R_{GEN}$ and keeping the RMS synthesized source current $I_{SOURCE}$ constant. In this case the synthesized source current has a value of $$I_{SOURCE} = V_{GEN}/R_{GEN}$$

In an embodiment, a microgrid electrical storage appliance control model comprises a synthesized voltage source of a variable voltage in a circuit path with a synthesized output resistance of fixed value. An electrical storage appliance controller achieves output power and charging control in an embodiment primarily by adjusting the value of the synthesized source voltage. From the theory of source transformations, a microgrid electrical storage appliance could equivalently comprise a synthesized current source of a variable voltage coupled across a synthesized output resistance of fixed value, and could achieve output power and charging control primarily through adjustment of the value of the synthesized source current.

The discussion of generator and electrical storage appliance control below will use the control model of a synthesized voltage source in a circuit path with a synthesized resistance. It should be understood that the model of a synthesized current source coupled across a synthetic resistance of identical value is equivalent.

Generators

Figure 2A:
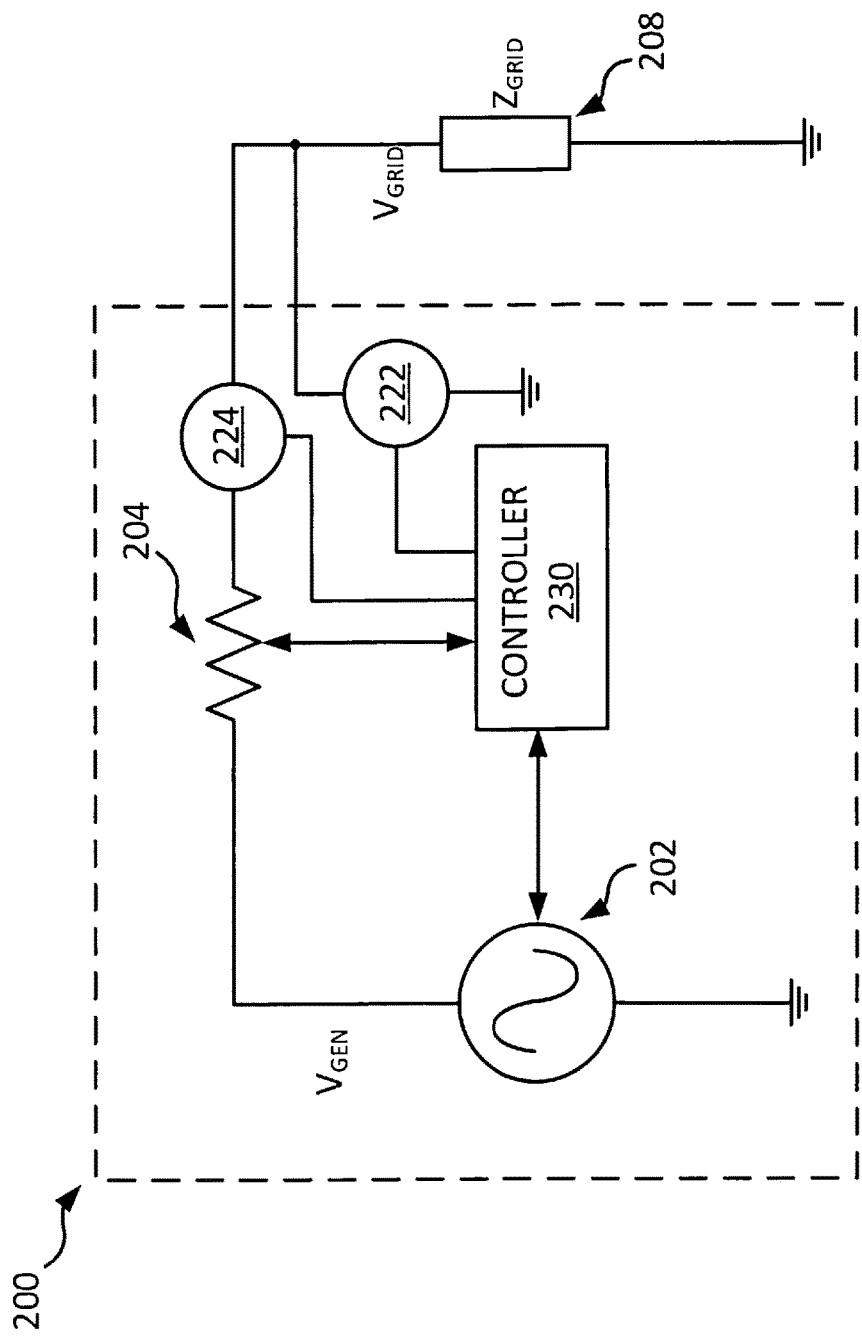
FIG. 2A is a schematic diagram of an example control model for an electrical power source.

FIG. 2A is a schematic diagram of an example control model for an electrical power source.

Generator control model 200 comprises synthetic or synthesized AC voltage source 202, in a circuit path with synthetic or synthesized resistance 204, a voltage sensor 222 such as a voltmeter, a current sensor 224 such as an ammeter, and a controller 230. The controller 230 could be implemented using hardware, firmware, or one or more elements that execute software. Electronic devices that might be suitable for implementing controller 230 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. Software could be stored in memory for execution. The memory could include one or more physical memory devices, including any of various types of solid-state memory devices and/or memory devices with movable or even removable storage media.

The rest of a microgrid is represented by impedance 208 of value $Z_{GRID}$ and an instantaneous voltage $V^*_{GRID}$. $V^*_{GRID}$ is a sinusoidally varying voltage with an RMS value of $V_{GRID}$. It should be understood that synthetic resistance 204 does not comprise a real resistance and does not dissipate any real power.

Synthetic voltage sources, current sources and resistances can be synthesised using switching mode power supply techniques. These techniques can create an effective, synthetic, or synthesized resistance in a frequency range of interest, which could include the microgrid frequency and a limited number (for example, ~40) of its harmonics. For example, a common North American grid frequency is 60 Hz and its fortieth harmonic has a frequency of 2460 Hz.

The generator modeled by the example generator control model 200 has a maximum RMS apparent output power of $S_{MAX}$ and a maximum available RMS real output power of $P_{MPP}$.

$S_{MAX}$ represents the maximum output power that the modeled generator is designed to produce. In the case of an AC PV generator for example, $S_{MAX}$ could correspond to the generator's output power under ideal insolation conditions (for example, Air Mass 1.5, no soiling or other degradation of the generator's PV panels with the PV panels operated at their maximum power point). In the case of a wind turbine $S_{MAX}$ could be the turbine output when operated at the maximum safe wind speed. $S_{MAX}$ could also or instead correspond to the maximum permissible continuous power of the generator's power conversion electronics. $S_{MAX}$ could also or instead correspond to the maximum permissible peak power of the generator's power conversion electronics. $P_{MPP}$ is the generator's maximum available RMS real output power under actual operating conditions and unconstrained by the state of a connected microgrid. For an AC PV generator for example, $P_{MPP}$ corresponds to the generator's output when operated under non-ideal conditions (e.g. shading, soiling of the generator's panel(s), late evening or early morning for example) but operated at the PV panel's maximum power point. $P_{MPP}$ will always be less than or equal to $S_{MAX}$.

A PV panel's maximum power point is the point on the PV panel's DC current versus DC voltage curve that produces the highest DC output power. An AC PV generator's inverter could determine the PV panel DC voltage and current. The inverter could contain Maximum Power Point Tracking (MPPT) circuitry to operate the panel(s) at the maximum power point. However, in circumstances described below, the state of a microgrid could instead involve an inverter reducing a microgrid connected generator's power to below its $P_{MPP}$.

In operation, controller 230 monitors the RMS and instantaneous value of the microgrid voltage ($V_{GRID}$ and $V^*_{GRID}$ respectively) using voltage sensor 222 and the RMS and instantaneous values of generator current ($I_{GEN}$ and $I^*_{GEN}$ respectively) using current sensor 224. Controller 230 controls the values of $R_{GEN}$ and $V_{GEN}$ in an embodiment. Controller 230 also controls the instantaneous generator voltage $V^*_{GEN}$ which is a sinusoidally varying voltage at the microgrid frequency. Controller 230 also receives measurements of $P_{MPP}$, the generator's maximum available output power under actual operating conditions, from its MPPT circuitry in the case of an AC PV generator. A separate voltage sensor 222 such as a voltmeter is for illustrative purposes, and voltage sensing could be integrated into controller 230. Similarly, a separate current sensor 224 such as an ammeter is for illustrative purposes and current sensing could be incorporated into controller 230. Controller 230, although shown as a single block, could comprise multiple controllers. For example, in the case of an AC PV generator one controller might manage the MPPT function while a second controller might manage the DC to AC conversion function.

The example control model 200 is thus illustrative of a distributed control model, in which a local controller 230 controls an electrical power source, in this case a generator, without a central controller.

Figure 2B:
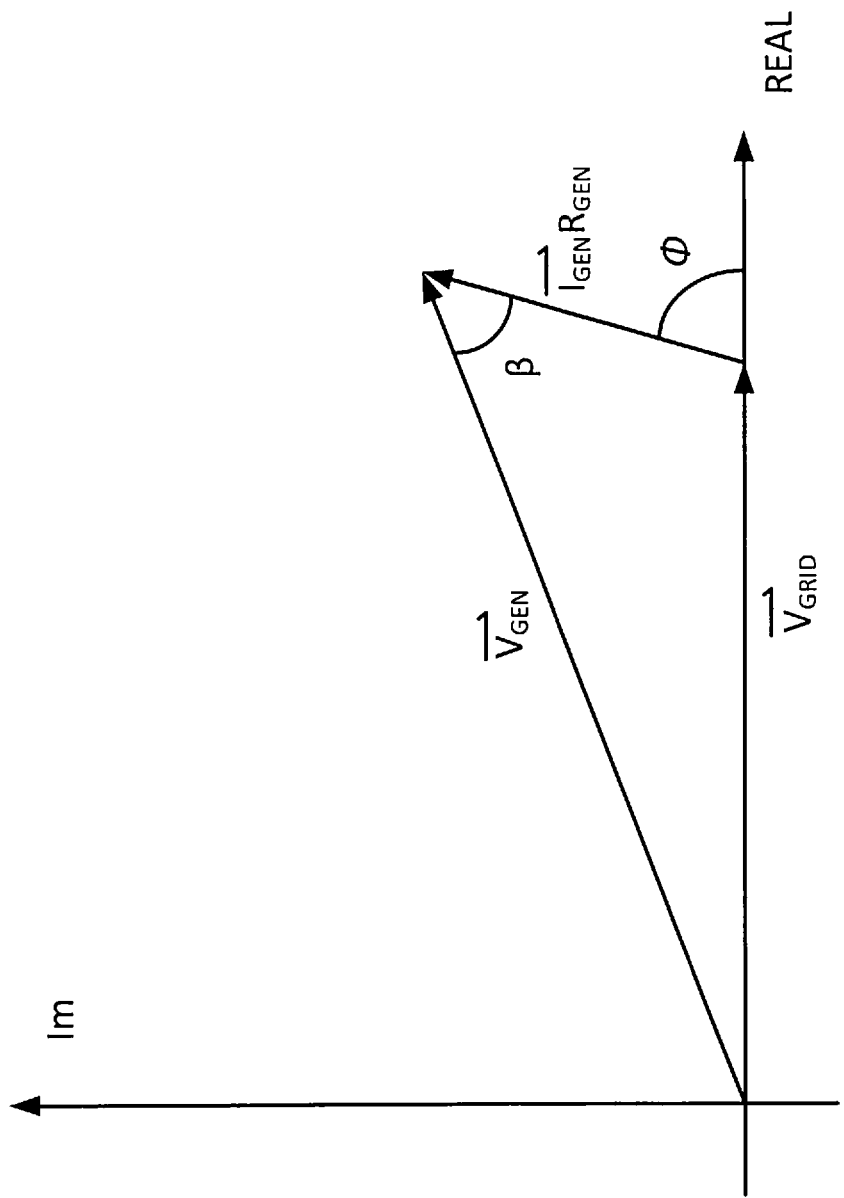
FIG. 2B is a vector diagram in complex space of an example relationship between microgrid voltage, generator voltage and generator current.

For a microgrid having impedance that is not a pure resistance, the voltage of microgrid, the generator current and the generator voltage should be treated as vector quantities and their relationship can be expressed by the formula:

$$\vec{V}_{GEN} = \vec{V}_{GRID} + \vec{I}_{GEN} R_{GEN}$$

where $\vec{V}_{GRID}$, $\vec{V}_{GEN}$ and $\vec{I}_{GEN}$ are vectors whose magnitude and phase represent the microgrid voltage, the generator voltage and the generator current, respectively. FIG. 2B is a vector diagram in complex space of an example relationship between microgrid voltage, generator voltage and generator current. The angle Ø in FIG. 2B represents the phase angle between the microgrid voltage and the electrical power source current. The apparent output power of the generator ($S_{GEN}$) can be expressed as:

$$S_{GEN} = I_{GEN} V_{GRID}$$

and using trigonometry $R_{GEN}$ can then be expressed as:

$$R_{GEN} = \frac{V_{GRID}}{S_{GEN}} [V_{GEN}^2 + V_{GRID}^2 - 2V_{GRID}V_{GEN}\cos(\phi - \beta)]^{1/2} \quad (1A)$$

where the angle β is defined as shown in FIG. 2B. To simplify computation, using trigonometric identities $R_{GEN}$ can also be expressed as:

$$R_{GEN} = \frac{V_{GRID}}{S_{GEN}} \left[ V_{GEN}^2 + V_{GRID}^2 - 2V_{GRID}V_{GEN}\left\{\cos(\phi)\sqrt{1-K^2\sin^2\phi} + K\sin^2(\phi)\right\} \right]^{1/2}$$

where $K = V_{GRID}/V_{GEN}$

Equation (1A) specifies the value of generator resistance $R_{GEN}$ that will supply an amount of apparent power $S_{GEN}$ into the microgrid. $R_{GEN}$ may also be expressed in terms of the real power ($P_{GEN}$) supplied to the microgrid.

$$R_{GEN} = \frac{V_{GRID}\cos\phi}{P_{GEN}} \left[ V_{GEN}^2 + V_{GRID}^2 - 2V_{GRID}V_{GEN}\left\{\cos(\phi)\sqrt{1-K^2\sin^2\phi} + K\sin^2(\phi)\right\} \right]^{1/2} \quad (1B)$$

Equation (1B) specifies the value of generator resistance that will supply an amount of real power $P_{GEN}$ at a phase angle of Ø into the microgrid.

In some cases $P_{GEN}$ could be equal to a PV generator's available power $P_{MPP}$. In situations where the microgrid impedance is resistive the phase angle Ø between the microgrid voltage and the electrical power source current is zero and equation (1B) simplifies to:

$$R_{GEN} = \frac{V_{GRID}(V_{GEN} - V_{GRID})}{P_{GEN}} \quad (1C)$$

Equation (1C) might be used in situations where the microgrid impedance is mostly resistive.

In situations where the microgrid impedance is purely reactive the phase angle Ø between the microgrid voltage and the electrical power source current is 90 degrees and equation (1B) simplifies to:

$$R_{GEN} = \frac{V_{GRID}(V_{GEN}^2 - V_{GRID}^2)^{1/2}}{S_{GEN}}$$

In this case the generator only supplies reactive power to the microgrid and does not supply any real power.

The microgrid could have a nominal RMS voltage of $V_{NOM}$ and a maximum RMS microgrid voltage of $V_{MAX}$. For example, in North America, $V_{NOM}$ is commonly 120 V. In some embodiments $V_{MAX}$ could be 10% higher than $V_{NOM}$. In some applications $V_{GRID}$ could be required to not exceed $V_{MAX}$ to prevent damage to microgrid connected devices. In one embodiment the $V_{GEN}$ of all microgrid connected generators is fixed at $V_{MAX}$. This could help prevent the microgrid voltage from exceeding $V_{MAX}$. This could also prevent potentially damaging reverse power flow from the microgrid into a generator due to a rapid rise in $V_{GRID}$. $V_{GRID}$ could rise if, for example, there were a sudden and large decrease in the microgrid loading.

The generator control model of FIG. 2A could support the microgrid during transient events. The instantaneous power ($P_{GEN}$) delivered to a resistive microgrid of instantaneous voltage $V^*_{GRID}$ by a generator with an instantaneous source voltage of $V^*_{GEN}$ and synthetic resistance $R_{GEN}$ is $$P^*_{GEN} = \frac{V^*_{GRID}(V^*_{GEN} - V^*_{GRID})}{R_{GEN}} \quad (2)$$

For given values of $V^*_{GEN}$ and $R_{GEN}$ equation (2) represents a parabola in $P^*_{GEN}$ and $V^*_{GRID}$ opening downward with a maxima at $V_{GRID} = V_{GEN}/2$ and which intercepts the $V^*_{GRID}$ axis at $V^*_{GRID}=0$ and $V^*_{GRID}=V^*_{GEN}$.

Figure 2C:
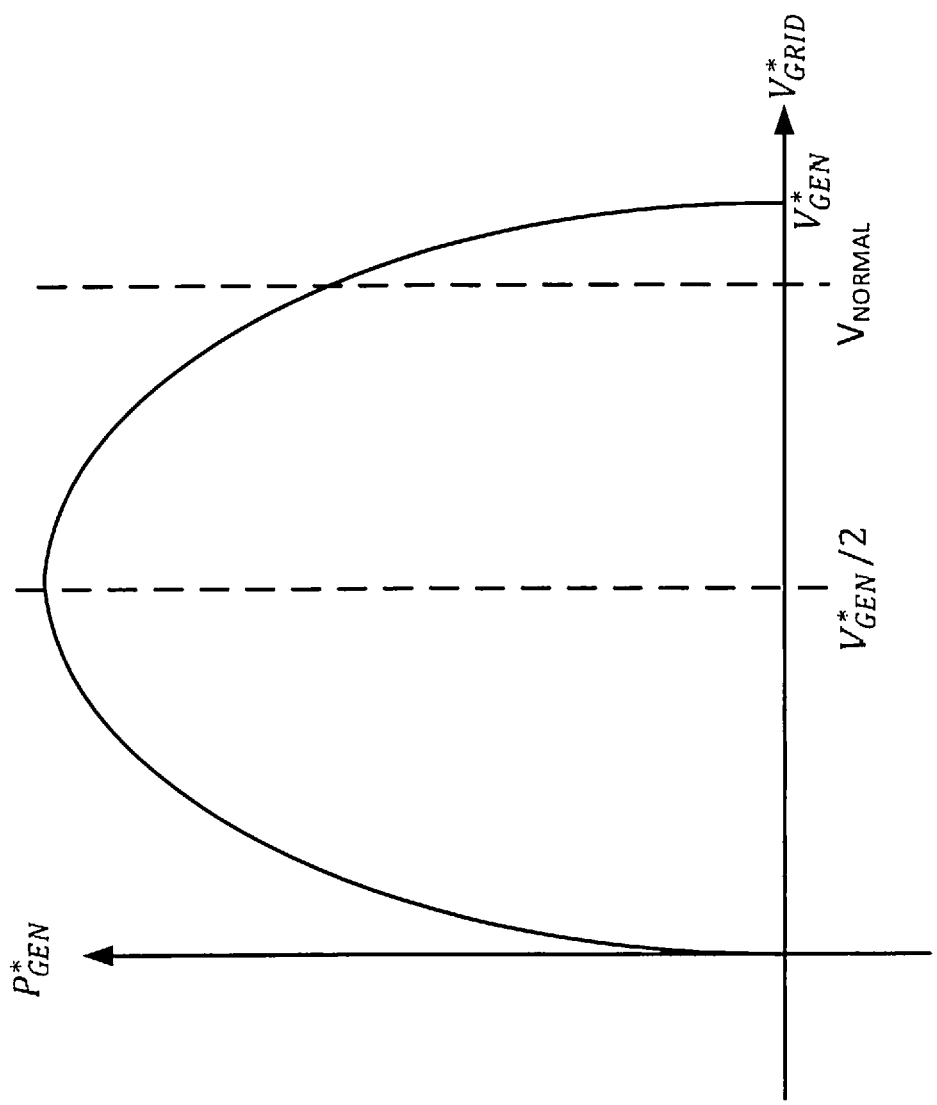
FIG. 2C is a graphical illustration of an example relationship between instantaneous power delivered by a generator ($P^*_{GEN}$) and instantaneous microgrid voltage ($V^*_{GRID}$).

FIG. 2C is a graphical illustration of an example relationship between $P^*_{GEN}$ and $V^*_{GRID}$. The normal operating voltage ($V_{NORMAL}$) for the microgrid could be about 10% less than $V^*_{GEN}$. If $V^*_{GRID}$ were to rise above this point due to, for example, a sudden increase in microgrid impedance then the instantaneous power supplied to the microgrid ($P_{GEN}$) will decrease until no power is delivered when $V^*_{GRID}=V^*_{GEN}$. Conversely, if $V^*_{GRID}$ were to decrease below $V_{NORMAL}$ due to a sudden decrease in microgrid impedance the instantaneous power supplied to the microgrid increases. Thus, a generator may desirably contribute to stability of the microgrid using the control model of FIG. 2A. It supplies increased power when the microgrid voltage drops and decreased power when the microgrid voltage rises. It could handle fast transient events such as rapid load changes or harmonics of the microgrid frequency.

Although this type of control may contribute to the stability of the microgrid in the face of rapid transients it could be desirable for a renewable power generator to deliver as much of its power to the microgrid as possible over longer timescales. Over longer timescales, or at lower response frequencies a generator could therefore be controlled to deliver its maximum available RMS output power $P_{MPP}$ to the microgrid across a microgrid voltage range by adjusting the generator resistance ($R_{GEN}$). In one embodiment the generator is controlled to have a source voltage of $V_{MAX}$ and a generator resistance $R_{GEN}$ as determined according to the following equation:

$$R_{GEN} = \frac{V_{GRID}\cos\emptyset}{P_{GEN}}\left[V_{MAX}^2 + V_{GRID}^2 - 2V_{GRID}V_{MAX}\left\{\cos(\emptyset)\sqrt{1-K'^2\sin^2\emptyset} + K'\sin^2(\emptyset)\right\}\right]^{1/2} \quad (3A)$$

Where $K' = V_{GRID}/V_{MAX}$

For a microgrid with a purely resistive impedance where $\emptyset=0$ equation (3A) simplifies to:

$$R_{GEN} = \frac{V_{MAX} \cdot V_{GRID} - V_{GRID}^2}{P_{MPP}} \quad (3B)$$

where $V_{GRID}$ is the RMS microgrid voltage and $V_{MAX}$ is the maximum RMS microgrid voltage.

For certain types of electrical generators $P_{MPP}$ could be variable. The $P_{MPP}$ of a PV generator, for example, varies with time of day and cloud conditions. Similarly, $P_{MPP}$ of a wind turbine will vary with wind speed. In an embodiment, variations in the $P_{MPP}$ of a generator are accommodated by continually adjusting the value the value of $R_{GEN}$ according to equation (3A) to ensure that an output power of $P_{MPP}$ is delivered to the microgrid. In this method, when $P_{MPP}$ is small the value of $R_{GEN}$ will be very large, when $P_{MPP}$ is large, $R_{GEN}$ will be small. In an embodiment, the controller 230 continuously calculates a new value for $R_{GEN}$ according to equation (3A) or equation (3B). For example, if the amount of sunshine changes, then $P_{MPP}$ changes and then the calculated value of $R_{GEN}$ will change. Similarly, for fluctuations in the microgrid voltage, if $V_{GRID}$ changes then $R_{GEN}$ will also change.

In some embodiments an upper limit could be placed on the value of $R_{GEN}$. This could prevent the generator from being completely isolated from the microgrid when $P_{MPP}$ is very small and could help maintain the frequency and phase synchronization of the generator with the microgrid. In one embodiment, the maximum value of $R_{GEN}$ is 100 kOhms. $R_{GEN}$ could be controlled differently while the generator is in the process of connecting to the microgrid and synchronizing its frequency and phase. It could be beneficial to keep the value of $R_{GEN}$ higher than the value prescribed by equation (3A) or equation (3B) above until synchronization is complete, to prevent large transients.

Since the microgrid voltage should not exceed $V_{MAX}$ a microgrid connected generator should not inject power into the microgrid when $V_{GRID}=V_{MAX}$. It could be beneficial to begin to reduce the amount of power injected into the microgrid as $V_{GRID}$ approaches $V_{MAX}$, to prevent a large discontinuity in the output power of the generator at $V_{GRID}=V_{MAX}$. As $V_{GRID}$ approaches $V_{MAX}$ the value of $R_{GEN}$ as determined by equation (3A) approaches zero. To prevent a discontinuity in the generator's output power and large transients near $V_{MAX}$, $R_{GEN}$ could be controlled to not go below a minimum value of resistance ($R_{MIN}$). In one embodiment the output resistance of the generator has an $R_{MIN}$ determined by the formula $$R_{MIN} = \frac{V_{GRID}\cos\emptyset}{P_{MAX}}\left[V_{MAX}^2 + V_{MAX1}^2 - 2V_{MAX1}V_{MAX}\left\{\cos(\emptyset)\sqrt{1-K''^2\sin^2\emptyset} + K''\sin^2(\emptyset)\right\}\right]^{1/2}$$

where $K''=V_{MAX1}/V_{MAX}$, $V_{MAX1}<V_{MAX}$ and $P_{MAX}$ is the maximum real output power of the generator.

For a purely resistive microgrid where $\emptyset=0$ this simplifies to:

$$R_{MIN} = \frac{V_{MAX} \cdot V_{MAX1} - V_{MAX1}^2}{P_{MAX}} \quad (4)$$

In this method, once $R_{GEN}$ has reached the lower limit of $R_{MIN}$ the power delivered to the microgrid is no longer constant and varies with the microgrid voltage. In this method the RMS power delivered to the microgrid ($P_{GEN}$) has a quadratic dependence on microgrid voltage once $R_{GEN}$ has reached the minimum limit of $R_{MIN}$ and is given by the formula $$P_{GEN} = \frac{V_{GRID}\cos\emptyset}{R_{MIN}}\Big[V_{MAX}^2 + V_{GRID}^2 -$$
$$2V_{GRID}V_{MAX}\{\cos(\emptyset)\sqrt{1-K'^2\sin^2\emptyset} + K'\sin^2(\emptyset)\}\Big]^{1/2}$$

For a purely resistive microgrid where Ø=0 this simplifies to $$P_{GEN} = \frac{V_{MAX} \cdot V_{GRID} - V_{GRID}^2}{R_{MIN}}$$

In one embodiment of this method $V_{MAX}$ is 10% above the nominal RMS microgrid voltage ($V_{NOM}$) and $V_{MAX1}$ is 5% above $V_{NOM}$.

In another embodiment the synthesized output resistance 204 of the generator control model in FIG. 2A has a lower limit as determined by the formula $$R_{MIN} = \frac{V_{MAX} \cdot V_{MAX1} - V_{MAX1}^2}{P_{MPP}} \quad (5)$$

Equation (5) may result in a higher value of $R_{MIN}$ than equation (4) since $P_{MPP} \leq P_{MAX}$. In this embodiment the generator's injected power into the microgrid ($P_{GEN}$) begins decreasing at a microgrid voltage of $V_{MAX1}$.

Figure 2D:
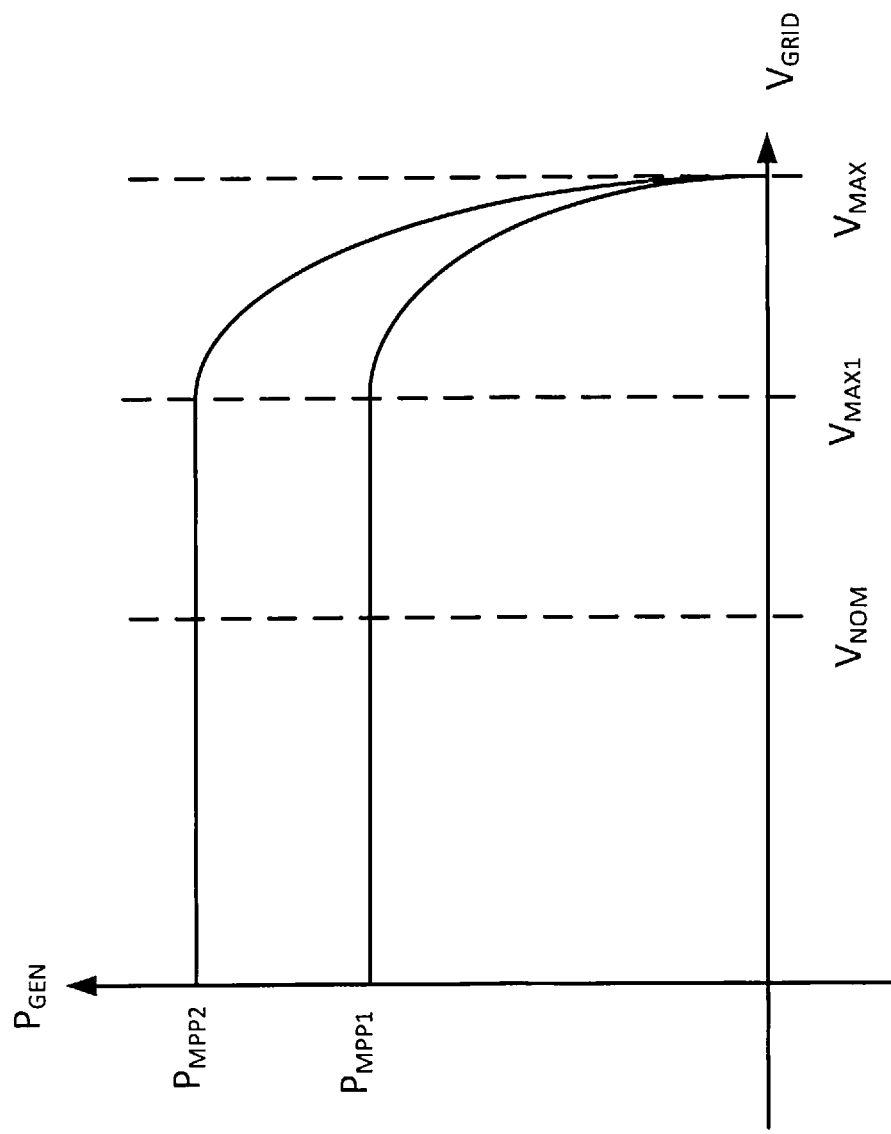
FIG. 2D is an example graph of power delivered by a generator ($P_{GEN}$) versus microgrid voltage ($V_{GRID}$) for two microgrid connected generators.

FIG. 2D is an example graph of $P_{GEN}$ versus microgrid voltage for two microgrid connected generators. The generators have maximum available output powers of $P_{MPP1}$ and $P_{MPP2}$ respectively and are both controlled according to equation (5). $P_{GEN}$ is held constant at $P_{MPP1}$ and $P_{MPP2}$, respectively for $V_{GRID} < V_{MAX1}$ by the adjustment of the generator synthetic output resistances. When $V_{GRID} = V_{MAX1}$ the minimum value of the generator synthetic output resistances is reached and the resistances are held at $R_{MIN}$ for $V_{GRID} > V_{MAX1}$. Their $P_{GEN}$ values then decrease parabolically, both reaching zero at $V_{MAX}$.

In this embodiment, a microgrid voltage above $V_{MAX1}$ signifies to all microgrid connected components that there is an excess of power generation and that all generators have begun to curtail their output power. This could be beneficial for controlling the state of the microgrid since this information could be used, for example, to activate low priority loads.

It should be appreciated that the example plots shown in FIG. 2D, and other plots herein, are for illustrative purposes. Similar or different characteristics could be observed under similar or different simulation and/or operating conditions.

Figure 2E:
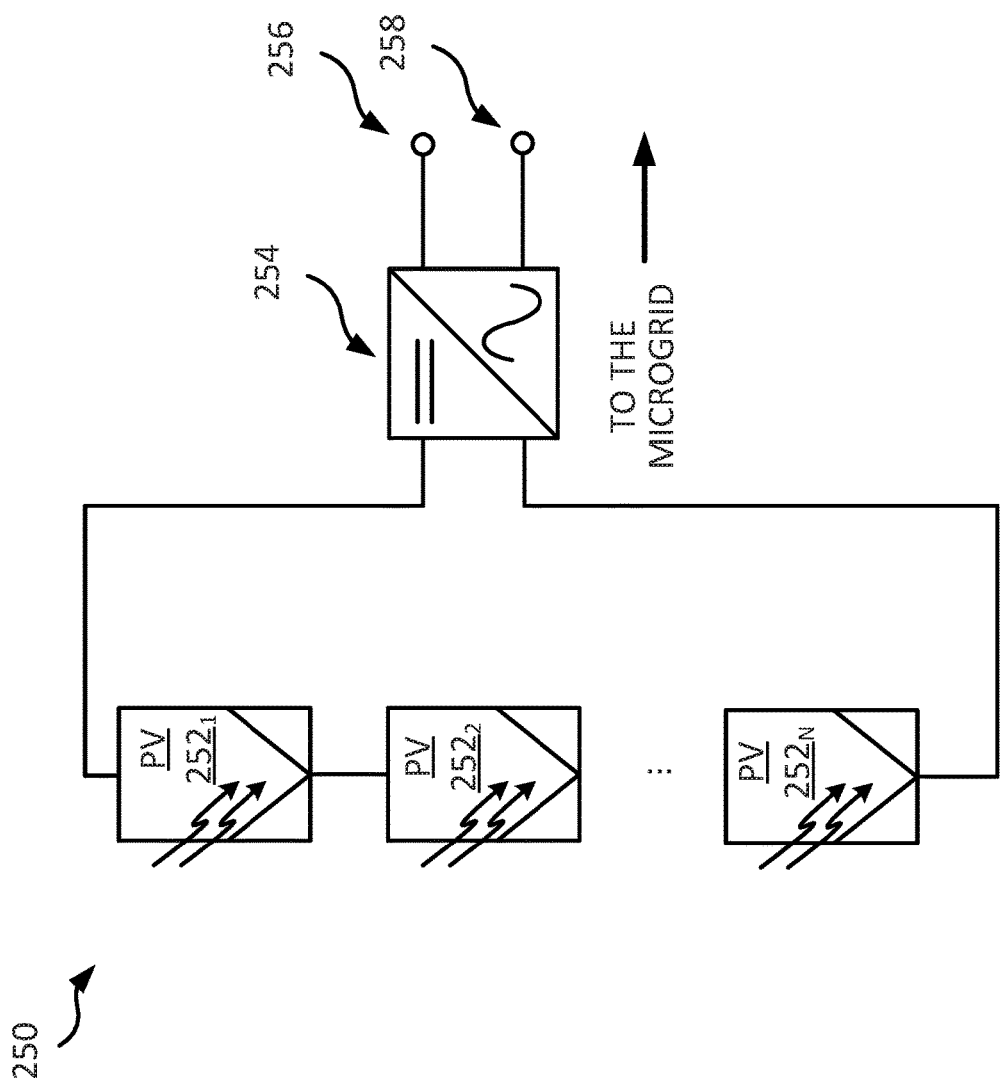
FIG. 2E is a block diagram of an example Alternating Current (AC) PhotoVoltaic (PV) generator.

FIG. 2E is a block diagram of an example AC PV generator. AC PV generator 250 comprises PV panels $252_1$, $252_2$, ... $252_N$ connected in a circuit path to the input of inverter 254. PV panels $252_1$, $252_2$, ... $252_N$ produce a combined DC voltage and current that is converted to an AC voltage and current by inverter 254 at terminal pair 256, 258.

Inverter 254 could include not only a power converter, but also a controller to synthesize synthetic voltage source 202 and synthetic resistance 204 of FIG. 2A as part of the DC to AC conversion process. A controller in the inverter 254 could also perform maximum power point tracking to keep the PV panels $252_1$, $252_2$, ... $252_N$ at their maximum power point.

Another possible option would be to provide a separate controller such as the controller 230 in FIG. 2A, coupled to at least the inverter 254 to control switching of switch elements in the inverter, and thereby control the synthetic or synthesized resistance 204 in the example control model of FIG. 2A. Current and voltage sensing at the inverter output terminal pair 256, 258, for example, could be implemented in the controller or separately in a current sensor and a voltage sensor as shown in FIG. 2A at 222, 224.

Thus, a controller could be integrated with a power converter into inverter 254, or implemented as a separate component.

FIG. 2E is for illustrative purposes only and other AC PV generator configurations are possible. For example, there could be only a single PV panel rather than multiple PV panels. Alternately there could be multiple strings of PV panels in respective circuit paths that are connected across the inverter input. Although inverter 254 is shown as a single-phase inverter, multi-phase inverter designs are possible. In other designs the maximum power point tracking function is performed by a separate device coupled to the PV panels or by separate devices coupled to each PV panel, rather than by the inverter 254.

Electrical Storage

A microgrid connected electrical storage appliance may provide such features as synchronizing frequency and phase to the microgrid, supporting the microgrid by providing power if it is available, storing power produced by the microgrid's generators if it is available, and meeting the charge/discharge objectives of the particular storage technology used as a storage device in the storage appliance.

Figure 3:
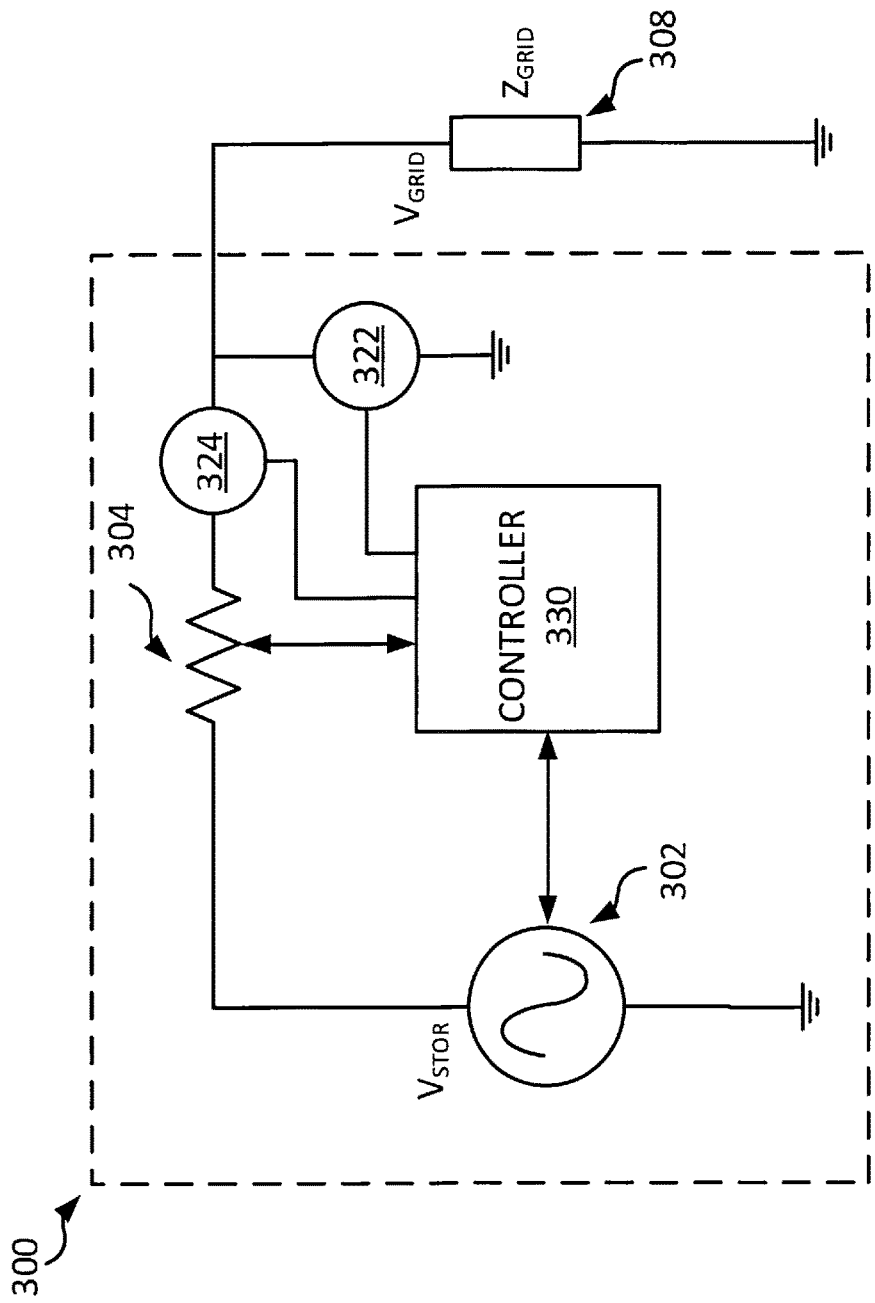
FIG. 3 is a block diagram of another example electrical power source control model.

FIG. 3 is a block diagram of another example electrical power source control model, this time for a microgrid connected electrical storage appliance. The electrical storage appliance control model 300 comprises synthetic AC voltage source 302 coupled in a circuit path with synthetic resistance 304, a voltage sensor 322 such as a voltmeter, a current sensor 324 such as an ammeter, and a controller 330. The controller 330 could be implemented, for example, in the same manner as noted above for the controller 220 in FIG. 2A. The remaining microgrid to which the electrical storage appliance modeled by the control model 300 is coupled is represented by impedance 308 of value $Z_{GRID}$ and RMS voltage $V_{GRID}$. AC voltage source 302 has an RMS voltage of $V_{STOR}$, an RMS output current $I_{STOR}$ and a maximum operating RMS power of $P_{S,MAX}$, $I_{STOR}$, and $V_{GRID}$, could be determined by the voltage sensor 322 and current sensor 324. $V_{STOR}$ could be determined by communication between controller 330 and AC voltage source 302.

Synthetic resistance 304 has a resistance value of $R_{STOR}$. Again, it should be understood that synthetic resistance 304 does not comprise a real resistance and does not dissipate any real power. Synthetic voltage sources and resistances can be created using switching mode power supply techniques, as noted above.

Controller 330 monitors the values of $V_{GRID}$, $V_{STOR}$ and $I_{STOR}$ and controls the values of $R_{GEN}$ and $V_{STOR}$. Controller 330 also determines the operating mode (charging or discharging) of the electrical storage appliance modeled by control model 300. Voltage sensor 322 is for illustrative purposes and voltage sensing could instead be performed by a single switched voltmeter or integrated into controller 330. Similarly, current sensor 324 is for illustrative purposes and current sensing could instead be incorporated into controller 330. Controller 330, although shown as a single block, could comprise multiple controllers. In one embodiment, there are separate controllers to control charging and power conversion.

Any of a variety of electrical storage devices in an electrical storage appliance are possible, and could include any one or more of AC batteries, AC fuel cells and AC flywheels. Current sensor 324 monitors the magnitude and direction of $I^*_{STOR}$ and could be used by controller 330 to select between charge and discharge operating modes. Controller 330 could also or instead use voltage sensor 322 to monitor the microgrid voltage and select operating modes on that basis.

Figure 4:
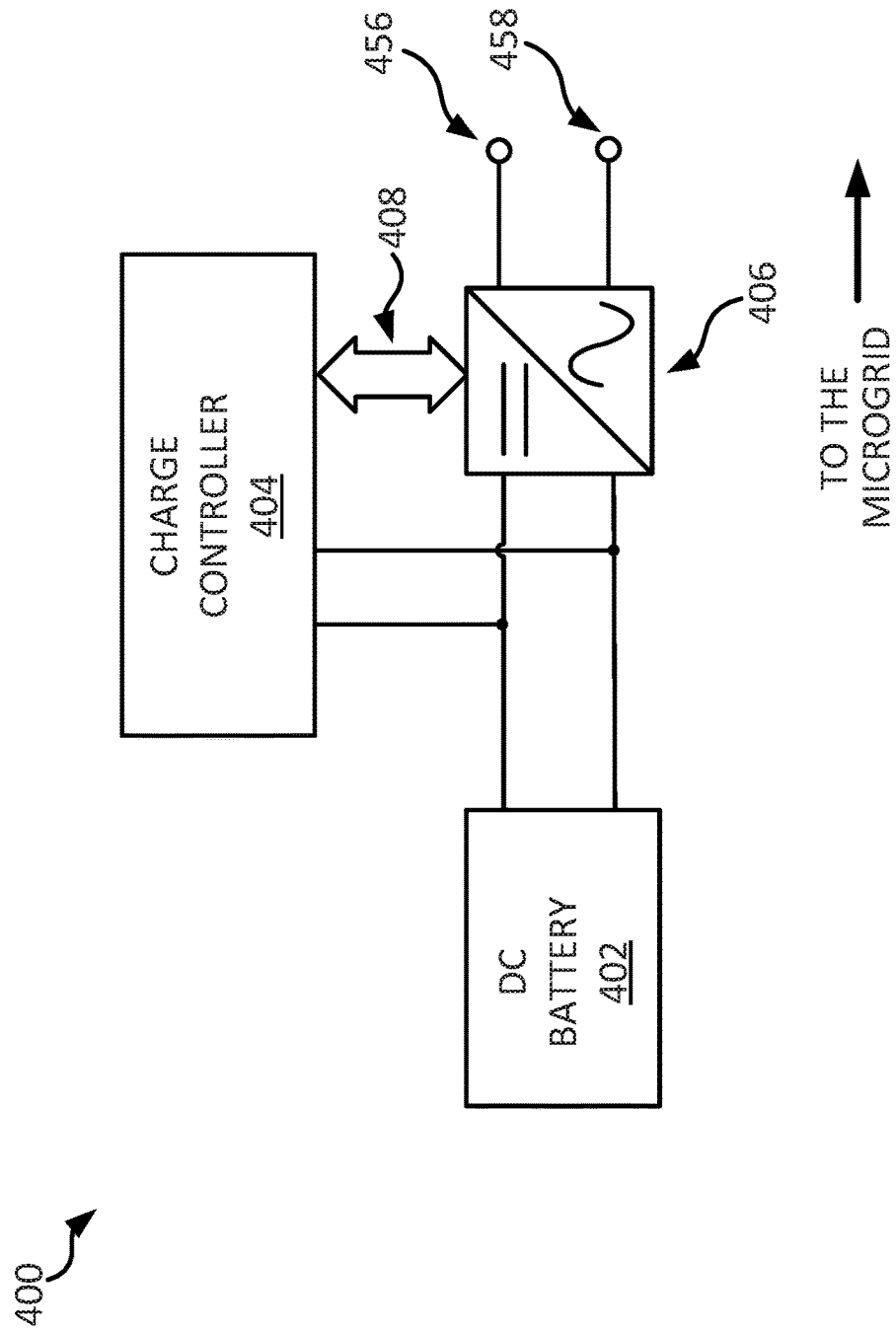
FIG. 4 is a block diagram of an example AC battery.

FIG. 4 is a block diagram of an example AC battery. AC Battery 400 comprises DC battery 402, charge controller 404, inverter 406 and communication and control bus 408. Charge controller 404 and inverter 406 communicate across communication and control bus 408. AC Battery 400 connects to the microgrid through terminals 456, 458. AC battery 400 is an example and other designs are possible. For example, inverter 406 is shown as single-phase however in other designs it might be multi-phase. In other designs charge controller 404 and inverter 406 could be integrated together.

Inverter 406 is bi-directional. When AC battery 400 is storing energy (charging) inverter 406 converts AC power from the microgrid into DC power to charge DC battery 402. When AC battery 400 is providing energy (discharging) inverter 406 converts DC power from battery 402 into AC power for the microgrid. Inverter 406 synthesizes voltage source 302 and resistance 304 of FIG. 3 as part of the DC to AC or AC to DC conversion process.

The controller 330 in FIG. 3 and the charge controller 404 in FIG. 4 could be different controllers or integrated into the same controller. For control of the synthetic or synthesized resistance 304, for example, controller 330 could also be coupled to the inverter 406, and current and voltage sensors could be coupled to the terminals 456, 458 or integrated into the controller 330. In a single-controller embodiment, one controller implements both the controller 330 and the charge controller 404.

Charge controller 404 monitors the voltage of DC battery 402. It could also monitor the current of DC battery 402. Charge controller 404 contains charging control algorithms for DC battery 402. It sets a target power inflow value ($P_{TAR}$) for the charging operation. $P_{TAR}$ is conventionally negative for charging a storage device. Charge controller 404 also calculates the state of charge (SoC) of DC battery 402. SoC is a measure of the amount of stored electrical energy and normally expressed as a percentage of the storage device's total storage capacity. When DC battery 402 is fully charged the SoC of storage appliance 400 is 100%, and when DC battery 402 is completely discharged the SoC of storage appliance 400 is 0%.

The SoC concept is not limited to batteries and can be applied to any electrical storage device such as an ultracapacitor or a fuel cell. The SoC concept can also be extended to any energy storage device, such as, for example a flywheel and simply represents the amount of stored energy as a percentage of the energy storage device's total storage capacity.

In the remaining discussion, the term SoC will be used to refer to the amount of stored energy as a percentage storage capacity of the electrical storage appliance.

In an embodiment, the controller 330 in electrical storage appliance control model 300 in FIG. 3 achieves output power control primarily by adjusting the value of $V_{STOR}$ based on storage management requirements and microgrid loading while keeping the value of output resistance $R_{STOR}$ constant for a purely resistive microgrid. For example, if $V_{STOR}$ is adjusted to be greater than $V_{GRID}$ then the electrical storage appliance modeled by the control model 300 will discharge and inject power into the microgrid. If $V_{STOR}$ is adjusted to be less than $V_{GRID}$ then the electrical storage appliance modeled by the control model 300 will charge and draw power from the microgrid. In one embodiment, the electrical storage appliance modeled by the control model 300 can only supply power to the microgrid when $V_{GRID}<V_{NOM}$ and can only draw power when $V_{GRID}>V_{NOM}$. In this method the value of $V_{STOR}$ is controlled differently depending on whether the storage is charging or discharging.

Storage Discharging

In an embodiment, when the electrical storage appliance modeled by the control model 300 is discharging, the value of $V_{STOR}$ is determined by its State of Charge (SoC). The dependence of $V_{STOR}$ on SoC is a monotonically increasing function with an upper limit and a lower limit. The larger the value of SoC, the larger the value of $V_{STOR}$. In one embodiment, $V_{STOR}$ is linearly dependent on SoC and varies between an upper value of $V_1$ and a lower value of $V_2$ and is given by the formula $$V_{STOR}=V_1*SoC+(1-SoC)*V_2 \qquad (6)$$

where $V_1>V_2$. In this embodiment, when a storage device is fully depleted and its SoC is zero, $V_{STOR}=V_2$ and when the storage device is fully charged and SoC=100%, $V_{STOR}=V_1$. In one embodiment $V_1$ is $V_{NOM}$ and $V_2$ is 5% below $V_{NOM}$. In this embodiment the maximum value of $V_{STOR}$ is therefore $V_{NOM}$. In this embodiment, due to this limitation on the value of $V_{STOR}$ the electrical storage appliance modeled by control model 300 does not provide power to the microgrid when $V_{GRID}>V_{NOM}$.

For some storage technologies it might not be desirable for an electrical storage device to either fully discharge to 0% SoC or fully charge to 100% SoC. In another embodiment then, the SoC of the electrical storage device is controlled to always be in a range between an upper SoC limit of $SoC_U$ and a lower limit SoC limit of $SoC_L$. In this embodiment the value of $V_{STOR}$ is given by the formula $$V_{STOR} = \frac{V_1*(SoC-SoC_L)+(SoC_U-SoC)*V_2}{SoC_U-SoC_L} \qquad (7)$$

where $V_1>V_2$.

FIG. 5A is a graphical illustration of an example relationship between $V_{STOR}$ and SoC. In this embodiment, $V_{STOR}=V_2$ when the electrical storage appliance modeled by control model 300 is at its lower SoC limit ($SoC_L$) and $V_{STOR}=V_1$ when the electrical storage appliance is at its upper limit ($SoC_U$). In one embodiment $V_1$ is $V_{NOM}$ and $V_2$ is 5% below $V_{NOM}$. In this embodiment the maximum value of $V_{STOR}$ is $V_{NOM}$ and the electrical storage appliance modeled by control model 300 therefore does not provide power to the microgrid when $V_{GRID}>V_{NOM}$.

Discharging of the electrical storage appliance modeled by control model 300 is also controlled by the value ($R_{STOR}$) of its output resistance 304. In an embodiment, $R_{STOR}$ is set to a value which is constant with the RMS microgrid voltage and only depends on the phase angle between the microgrid voltage and the electrical power source output current Ø. In one embodiment $$R_{STOR} = \frac{V_{MIN2}\cos\emptyset}{P_{S,MAX}}\left[V_{MIN2}^2 + V_{MIN1}^2 - \right.$$

-continued $$2V_{MIN1}V_{MIN2}\{\cos(\emptyset)\sqrt{1-K'''^2\sin^2\emptyset}+K'''\sin^2(\emptyset)\}]^{1/2}$$

where $K'''=V_{MIN2}/V_{MIN1}$

For a purely resistive microgrid where $\emptyset=0$ this simplifies to:

$$R_{STOR}=\frac{V_{MIN2}\cdot V_{MIN1}-V_{MIN2}^2}{P_{S,MAX}} \quad (8)$$

where $V_{MIN2}<V_{MIN1}<V_{NOM}$. This value of $R_{STOR}$ results in a voltage drop of $V_{MIN1}-V_{MIN2}$ across $R_{STOR}$ when the electrical storage appliance modeled by control model 300 is at its maximum operating power $P_{S,MAX}$.

In this embodiment, if $V_{STOR}$ is at $V_{MIN1}$ the voltage at the output of the storage ($V_{GRID}$) is guaranteed to be greater than or equal to $V_{MIN2}$. For example, under worst case conditions a storage device is fully depleted with $SoC=SoC_L$, $V_{STOR}$ will be at its lowest value of $V_{MIN1}$ and the storage will be delivering maximum power ($P_{S,MAX}$) and the microgrid voltage will be $V_{MIN2}$. In one embodiment $V_{MIN2}$ is 10% below the nominal microgrid voltage ($V_{NOM}$) and $V_{MIN1}$ is 5% below the nominal microgrid voltage.

In another embodiment $$R_{STOR}=\frac{V_{NOM}\cdot V_{MIN1}-V_{MIN1}^2}{P_{S,MAX}} \quad (9)$$

This value of $R_{STOR}$ results in a voltage drop of $V_{NOM}-V_{MIN1}$ across $R_{STOR}$ when the storage device is at its maximum operating power $P_{S,MAX}$. In this embodiment a storage with an SoC of $SoC_U$ will reach an output power of $P_{S,MAX}$ at a microgrid voltage of $V_{MIN1}$.

Once the electrical storage appliance modeled by control model 300 has reached its maximum output power of $P_{S,MAX}$ its output power could be limited to that value to prevent damage to the storage appliance. In one embodiment then, once the maximum output power of the electrical storage appliance modeled by control model 300 is reached, its output power is limited from further increases caused by a further decrease in $V_{GRID}$ by decreasing $V_{STOR}$ below the value determined by its SoC, (equations (6) or (7) for example). In one embodiment $$V_{STOR}=\frac{R_{STOR}(\cdot P)_{S,MAX}+V_{GRID}^2}{V_{GRID}} \quad (10)$$

In this embodiment, after the $P_{S,MAX}$ limit is reached, $V_{STOR}$ tracks the microgrid voltage downwards to maintain $P_{STOR}$ at $P_{S,MAX}$. This embodiment could be useful in handling voltage transients since $R_{STOR}$ remains the same and is not increased. A low value of $R_{STOR}$ allows storage to react quickly to rapid transient changes in the microgrid voltage.

Figure 5B:
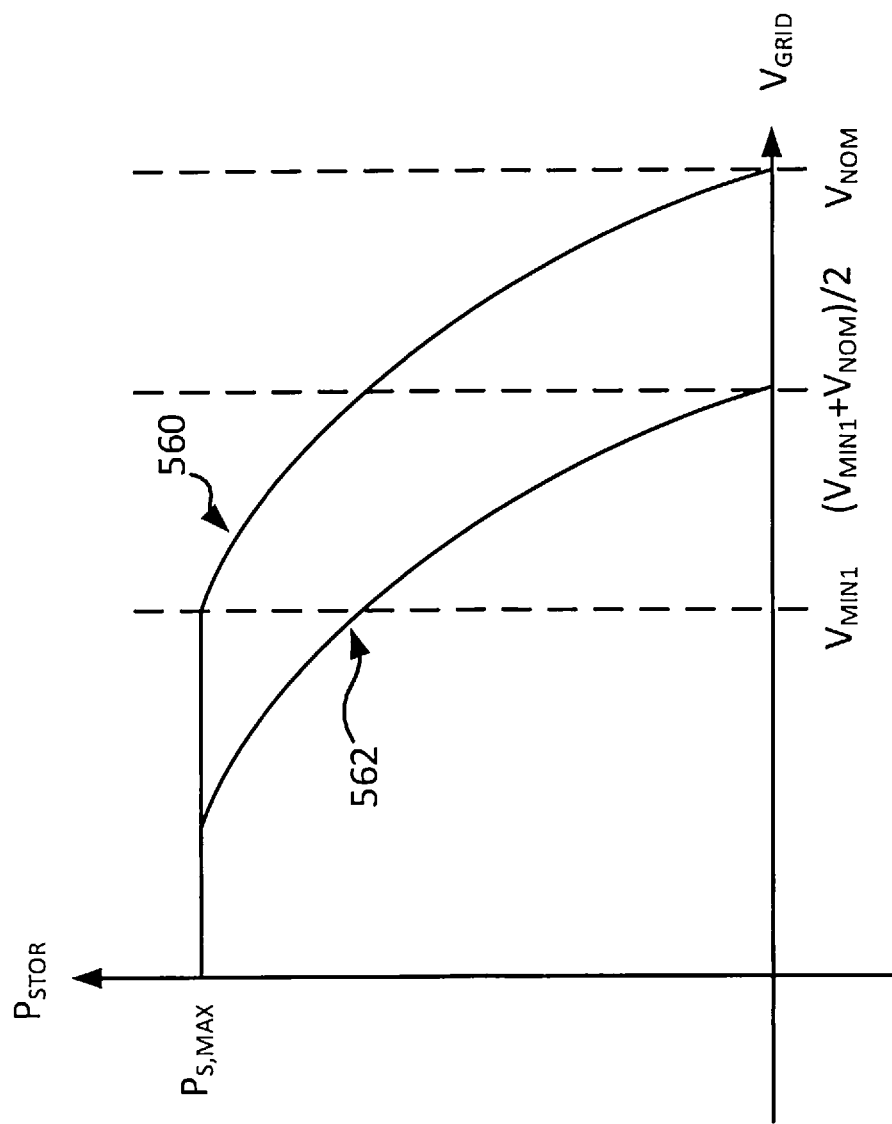
FIG. 5B is a graphical illustration of an example relationship between RMS power delivered by an electrical storage appliance ($P_{STOR}$) and microgrid voltage ($V_{GRID}$) for two different electrical storage appliances with different SoC values.

FIG. 5B is a graphical illustration of an example relationship between $P_{STOR}$ and the microgrid voltage $V_{GRID}$ for two different electrical storage appliances with different SoC values. $V_{STOR}$ is determined according to equation (7) where $V_1=V_{NOM}$ and $V_2=V_{MIN1}$. Curve 560 represents the behavior of an electrical storage appliance with an SoC of $SoC_U$.

$P_{STOR}$ is zero at a microgrid voltage of $V_{NOM}$ and increases parabolically as the microgrid voltage decreases until $P_{STOR}$ reaches a value of $P_{S,MAX}$ at a microgrid voltage of $V_{MIN1}$ and is constant thereafter.

Curve 562 represents the behavior of an electrical storage appliance with an SoC of $(SoC_L+SoC_U)/2$. It does not begin discharging until the microgrid voltage is below its value of $V_{STOR}$ which from equation (7) is $(V_{MIN1}+V_{NOM})/2$. $P_{STOR}$ is zero at a microgrid voltage of $(V_{MIN1}+V_{NOM})/2$ and increases parabolically as the microgrid voltage decreases until $P_{STOR}$ reaches a value of $P_{S,MAX}$ and is constant thereafter.

In general, when $R_{STOR}$ is determined by equation (9), a storage device will reach its maximum output power ($P_{STOR}=P_{S,MAX}$) at a microgrid voltage given by the equation $$V_{GRID}=\frac{V_{STOR}+\sqrt{V_{STOR}^2-4V^{*2}}}{2} \quad (11)$$

where $V_{STOR}$ is given by equation (6) or equation (7) and $V^*$ is given by the equation $$V^*=V_{NOM}V_{MIN1}-V_{MIN1}^2 \quad (12)$$

In general, when $R_{STOR}$ is determined by equation (9), for a particular microgrid voltage $V_{GRID}$, all storage devices with an SoC value of $SoC\geq SoC_{MAX}$ will be discharging at full power. $SoC_{MAX}$ is given by the equation $$SoC_{MAX}=(SoC_U-SoC_L)\left[\frac{V_{MIN1}}{V_{GRID}}-\frac{V_{MIN1}-V_{GRID}}{V_{NOM}-V_{MIN1}}\right]+SoC_L \quad (13)$$

The microgrid voltage $V_{GRID}$ could therefore signal the output power status of microgrid connected electrical storage appliances (discharging at full power or at less than full power). In addition, referring to FIG. 3A, the voltage drop across the synthesized resistance 304 of electrical storage appliance control model 300 could provide information about the rate at which stored energy is being consumed.

In another embodiment, once the maximum output power of the electrical storage appliance modeled by control model 300 is reached its output power is limited from further increases by increasing the value of $R_{STOR}$ above the value as determined by equation (7). In this embodiment the value of $R_{STOR}$ could be determined by the equation:

$$R_{STOR}=\frac{V_{STOR}\cdot V_{GRID}-V_{GRID}^2}{P_{S,MAX}} \quad (14)$$

It could be desirable to limit the output power of an electrical storage appliance when its SoC is at or near $SoC_L$ since a storage appliance with a low SoC might not be able to reliably deliver an output power of $P_{S,MAX}$. Its power output could drop rapidly and unpredictably as SoC nears $SoC_L$ causing instabilities in the microgrid. To improve microgrid stability the value of $P_{S,MAX}$ used in equation (9) to calculate $R_{STOR}$ could be a function of SoC whereby $P_{S,MAX}$ could be proportional to and monotonically increasing with SoC. $P_{S,MAX}$ could be at or close to its nominal value at SoC values near $SoC_U$ and assume a reduced value at values of SoC near $SoC_L$, for example when SoC is within $SoC_L+5\%$. This would effectively increase $R_{STOR}$ in the vicinity of $SoC_L$ and decrease the output power of the electrical storage appliance. Tapering off power output as SoC approaches $SoC_L$ avoids discharging at full power when SoC is low, which may be desirable for at least some types of storage devices.

Figure 5C:
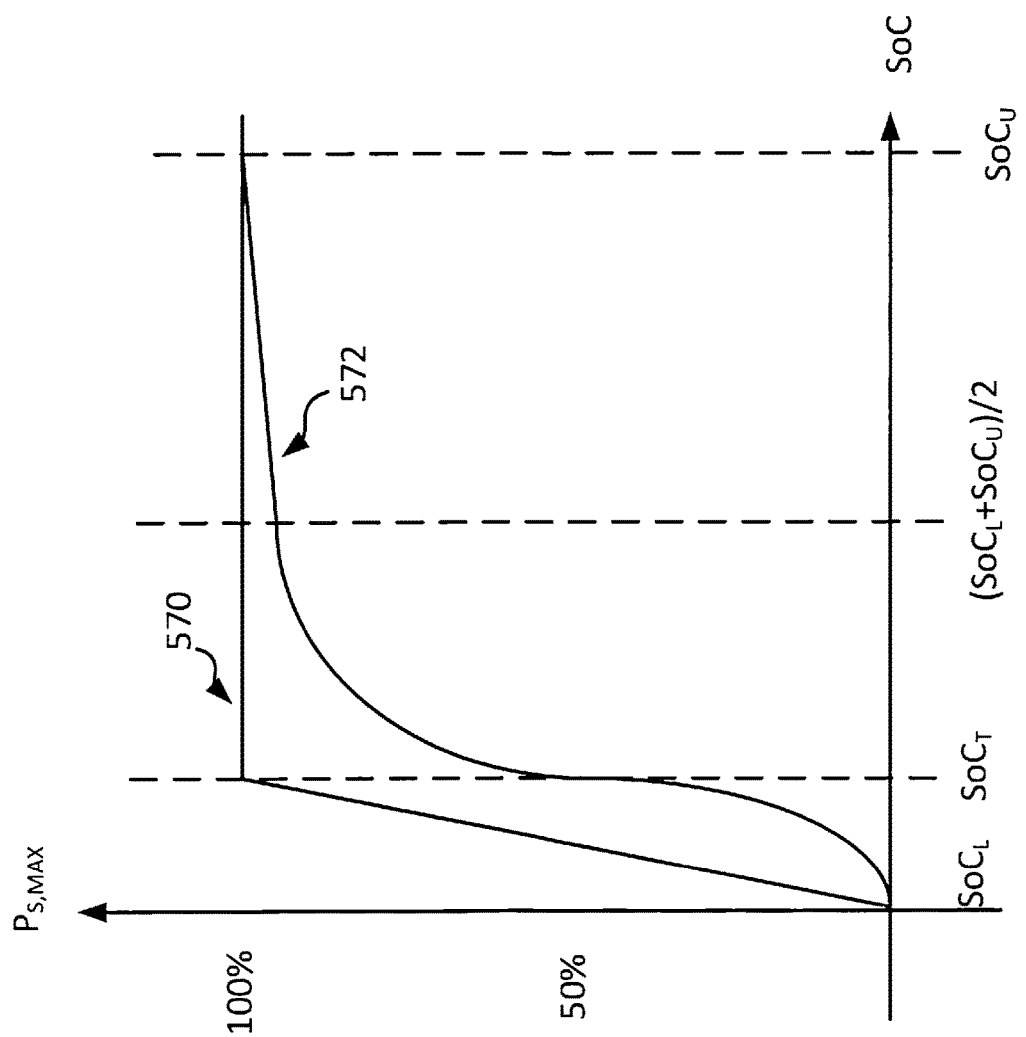
FIG. 5C is a graphical illustration of example relationships between maximum RMS power output ($P_{S,MAX}$) and SoC for an electrical storage appliance.

FIG. 5C is a graphical illustration of example relationships between $P_{S,MAX}$ and SoC for an electrical storage appliance.

Curves 570 and 572 show two example relations between $P_{S,MAX}$ and SoC. Curve 570 shows a piecewise linear relation and curve 572 shows a sigmoidal relation. In the piecewise linear relation $P_{S,MAX}$ is 100% of its nominal value until a threshold value of SoC ($SoC_T$) is reached after which $P_{S,MAX}$ decreases linearly with SoC. $SoC_T$ could represent an SoC value above which storage can reliably deliver 100% of its $P_{S,MAX}$. In the piecewise linear relation of curve 570, storage delivers 100% of $P_{S,MAX}$ above $SoC_T$.

Curve 572 shows a sigmoidal relation between $P_{S,MAX}$ and SoC. At $SoC_U$, $P_{S,MAX}$ is 100% of the nominal value. As SoC decreases, $P_{S,MAX}$ slowly decreases, reaching a value of 95% of $P_{S,MAX}$ at the midpoint of the SoC range (($SoC_L+SoC_U$)/2). $P_{S,MAX}$ then decreases more rapidly as it nears $SoC_T$, reaching 50% of nominal at $SoC_T$ and then decreases to substantially zero at $SoC_L$. The absence of discontinuities in the sigmoidal relation of curve 572, could make power delivery easier to control.

Figure 5D:
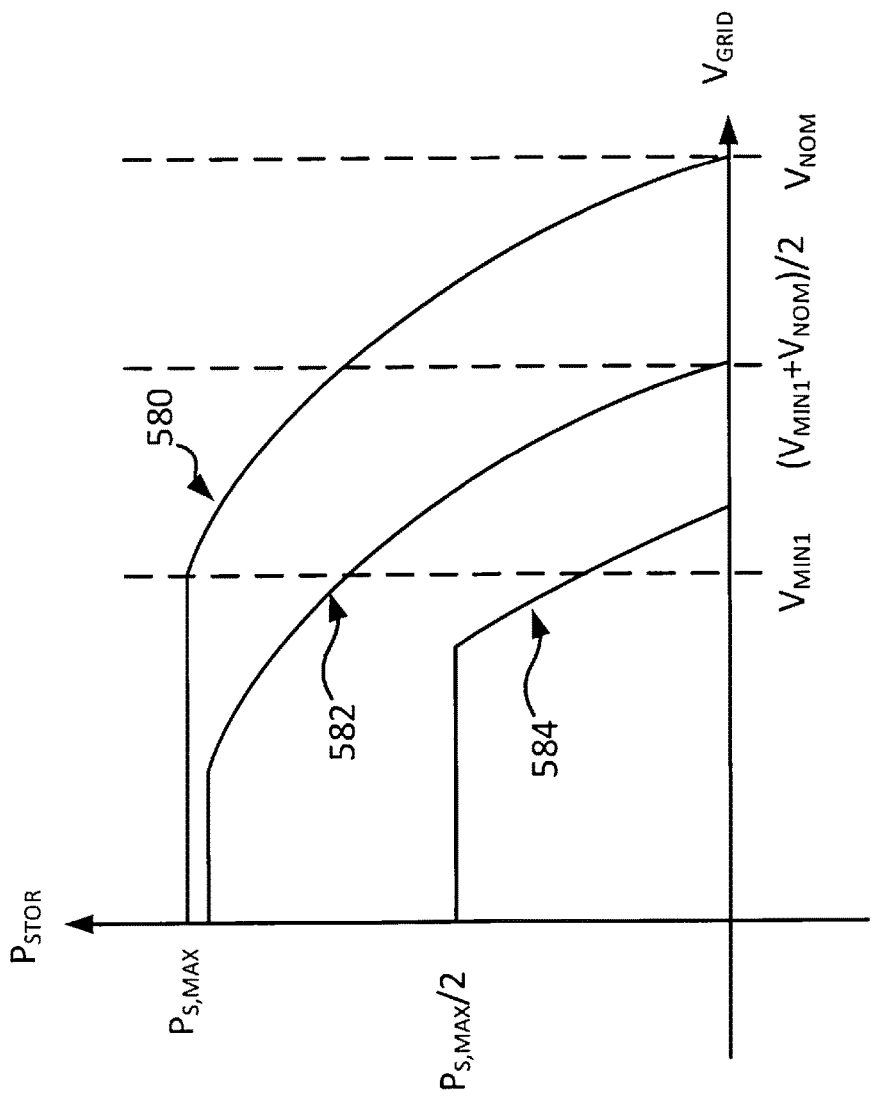
FIG. 5D is a graphical illustration of an example relationship between $P_{STOR}$ and microgrid voltage ($V_{GRID}$) when $P_{S,MAX}$ is a function of SoC according to curve 572 of FIG. 5C.

FIG. 5D is a graphical illustration of an example relationship between $P_{STOR}$ and the microgrid voltage $V_{GRID}$ when $P_{S,MAX}$ is a function of SoC according to curve 572 of FIG. 5C. Curve 580 represents the behavior of an electrical storage appliance with an SoC of $SoC_U$. $P_{STOR}$ is zero at a microgrid voltage of $V_{NOM}$ and increases parabolically as the microgrid voltage decreases until $P_{STOR}$ reaches a value of 100% of $P_{S,MAX}$ at a microgrid voltage of $V_{MIN1}$ and is constant thereafter. Curve 582 represents the behavior of an electrical storage appliance with an SoC of ($SoC_L+SoC_U$)/2. It does not begin discharging until the microgrid voltage is below its value of $V_{STOR}$ which from equation (7) is ($V_{MIN1}+V_{NOM}$)/2 if $V_1=V_{NOM}$ and $V_2=V_{MIN1}$. $P_{STOR}$ increases parabolically as the microgrid voltage decreases until $P_{STOR}$ reaches a value of 95% of $P_{S,MAX}$ and is constant thereafter. Curve 584 represents the behavior of an electrical storage appliance with an SoC of $SoC_T$. $P_{STOR}$ increases parabolically as the microgrid voltage decreases until $P_{STOR}$ reaches a value of 50% of $P_{S,MAX}$ and is constant thereafter.

Storage Charging

When $V_{GRID}>V_{NOM}$ and the electrical storage appliance modeled by control model 300 is charging, the power inflow could be controlled according to a charging control algorithm to prolong the lifetime of the storage device. For example, some types of electrical storage devices are best charged at a very slow rate to maximize their lifetime while others are best charged at a very rapid rate. Some are best charged only when their SoC is close to zero and should therefore be controlled to charge more rapidly at a low SoC than at a high SoC. Other types should be controlled to charge more rapidly at a higher value of SoC to help prevent their SoC dropping below a certain value. In an embodiment, storage charging is controlled by controlling the value of the synthesized voltage $V_{STOR}$ of the electrical storage appliance.

The value $V_{STOR}$ of voltage source 302 when charging could be determined according to the formula $$V_{STOR} = \frac{P_{TAR}P_{STOR} + V_{GRID}^2}{V_{GRID}} \quad (15)$$

where $P_{TAR}$ is the target charging power. $P_{TAR}$ is conventionally negative for charging since the storage appliance is consuming power. In the AC battery 400 of FIG. 4 $P_{TAR}$ is determined by charge controller 404. It implements a charge control algorithm specific to the technology of DC battery 402 in an embodiment. Charge controller 404 passes the value of $P_{TAR}$ to inverter 406. Inverter 406 then determines the value of $V_{STOR}$ and $R_{STOR}$ based on the value of $P_{TAR}$. In other types of electrical storage appliances $P_{TAR}$ may be determined by that appliance's specific charge algorithm and controller.

In this method, when the target power inflow ($P_{TAR}$) is $V_{STOR}=V_{GRID}$ and $V_{STOR}$ just mirrors the microgrid voltage resulting in no power flow and no charging of the storage device. For a non-zero target power, $V_{STOR}$ will adjusted to be less than $V^*_{GRID}$ ($P_{TAR}$ is negative since the storage is consuming power). In this method $V_{STOR}$ varies linearly with $P_{STOR}$. It could be beneficial to the transient response of the microgrid to place a lower limit on the value of $V_{STOR}$ as calculated by equation (14). A limitation on the value of $V_{STOR}$ while charging could be helpful in a situation where the microgrid voltage drops suddenly from above $V_{NOM}$ to below $V_{NOM}$. In this situation it could be beneficial if the electrical storage appliance modeled by control model 300 were to switch quickly from charging mode to discharging mode to support the microgrid. A lower limit on $V_{STOR}$ could improve the response time of the electrical storage appliance modeled by control model 300 and improve microgrid stability.

In one embodiment, the lower limit ($V_{STOR,MIN}$) is the value of $V_{STOR}$ as calculated if the storage were discharging. In one embodiment $$V_{STOR,MIN} = V_1 * SoC + (1 - SoC) * V_2 \quad (16)$$

In this embodiment the lower limit on $V^*_{STOR}$ is variable and depends on the SoC of the storage. In one embodiment $V_1=V_{NOM}$ and $V_2=V_{MIN1}$. In this embodiment, $V_{STOR,MIN}=V_{NOM}$ for a fully charged electrical storage device and $V_{STOR,MIN}=V_{MIN1}$ for a fully depleted device. In this embodiment a storage device with a low state of charge is allowed a lower voltage than one with a higher SoC. The lower SoC device could recharge itself at a higher power and be in a position to support the microgrid sooner, subject to the limitations of its charge control algorithms. In this embodiment $V_{STOR}$ is always greater than or equal to $V_{MIN1}$.

In one embodiment of this method the value ($R_{STOR}$) of synthesized resistance 304 has the same value while charging as it does while discharging and is given by the formula $$R_{STOR} = \frac{V_{MIN2} \cdot V_{MIN1} - V_{MIN2}^2}{P_{S,MAX}} \quad (17)$$

Charge to Discharge Transition

Various refinements to microgrid control as described above are possible. In one refinement, to prevent large transients there is a delay before an electrical storage appliance switches between its charging and discharging modes.

Storage will switch modes when the microgrid voltage crosses a threshold value, which could be $V_{NOM}$ in one embodiment. It could be beneficial to have a charge to discharge transition delay shorter than the discharge to charge delay, reflecting the greater importance of supporting the microgrid voltage versus charging storage. In one embodiment the charge to discharge and discharge to charge delay times are one millisecond and 100 milliseconds, respectively.

$V_{MIN2}=V_{NOM}-10\%$. In one embodiment the RMS values of $V_{MAX2}$, $V_{MAX1}$, $V_{NOM}$, $V_{MIN}$, $V_{MIN2}$ are 264 V, 253 V, 240 V, 216 V and 200 V respectively.

Table 1 below describes illustrative examples of information that could be conveyed by different microgrid voltage conditions. Such information could thus be conveyed to distributed controllers for generation, storage, and/or loads connected to a microgrid, without using a separate communication channel.

| Condition | Generator State | Storage State | Microgrid state | Load Instructions |
|---|---|---|---|---|
| $V_{GRID} = V_{MAX}$ | Generators are not injecting power | All storage fully charged with SoC = 100% | Total load is zero | All loads may operate regardless of priority |
| $V_{MAX2} > V_{GRID} > V_{MAX1}$ | All generators injecting less than their $P_{MPP}$ | Storage charge requirement being met, storage is either charging or fully charged | Total available power of generators exceeds load and storage charging requirements | All loads may operate regardless of priority Storage loads can start |
| $V_{MAX1} > V_{GRID} > V_{NOM}$ | Generators injecting $P_{MPP}$ | Storage charge requirement being met, storage is either charging or fully charged | Total available power of generators capacity is equal to load and storage charging requirements | Some loads may operate, depending on priority |
| $V_{NOM} > V_{GRID} > V_{MIN1}$ | Generators injecting $P_{MPP}$ | Storage is discharging at less than maximum power | Total available power of generators is less than load requirement, power from storage is required | Low priority loads may be disconnected or not started Storage loads should not start |
| $V_{GRID} = V_{MIN1}$ | Generators injecting $P_{MPP}$ | Storage is discharging, storage with SoC = 100% has reached maximum power if $R_{STOR}$ determined by equation 9 | Total available power of generators is less than load requirement, power from storage is required | All but highest priority loads may be disconnected Storage loads should not start |
| $V_{MIN1} > V_{GRID} > V_{MIN2}$ | Generators injecting $P_{MPP}$ | Storage is discharging, storage with SoC $\geq$ SoC$_{MAX}$ has reached $P_{SMAX}$ | Total available power generation is less than load requirement, power from storage is required | All but highest priority loads may be disconnected Storage loads should not start |
| $V_{GRID} = V_{MIN2}$ | Generators injecting $P_{MPP}$ | Storage is discharging, all storage has reached maximum output power if $R_{STOR}$ determined by equation 8 | Total available power (generation and storage) just meets load requirements | All loads should be off |

In another refinement, electrical storage appliance 400 does not immediately try to meet its charging power target $P_{TAR}$ when $V_{GRID}$ crosses above the threshold between charging and discharging. In this embodiment, the threshold voltage is $V_{NOM}$ and the power target is adjusted such that it varies linearly from zero at a microgrid voltage of $V_{NOM}$ to its full value (as determined by charge controller 404) at a microgrid voltage of $V_{NOM}+\Delta V$. In one embodiment $\Delta V$ is 1 V and $V_{NOM}$ is 240 V. This could reduce the size of transients created by an electrical storage appliance switching from discharging to charging mode.

Voltage Semantics

Figure 6:
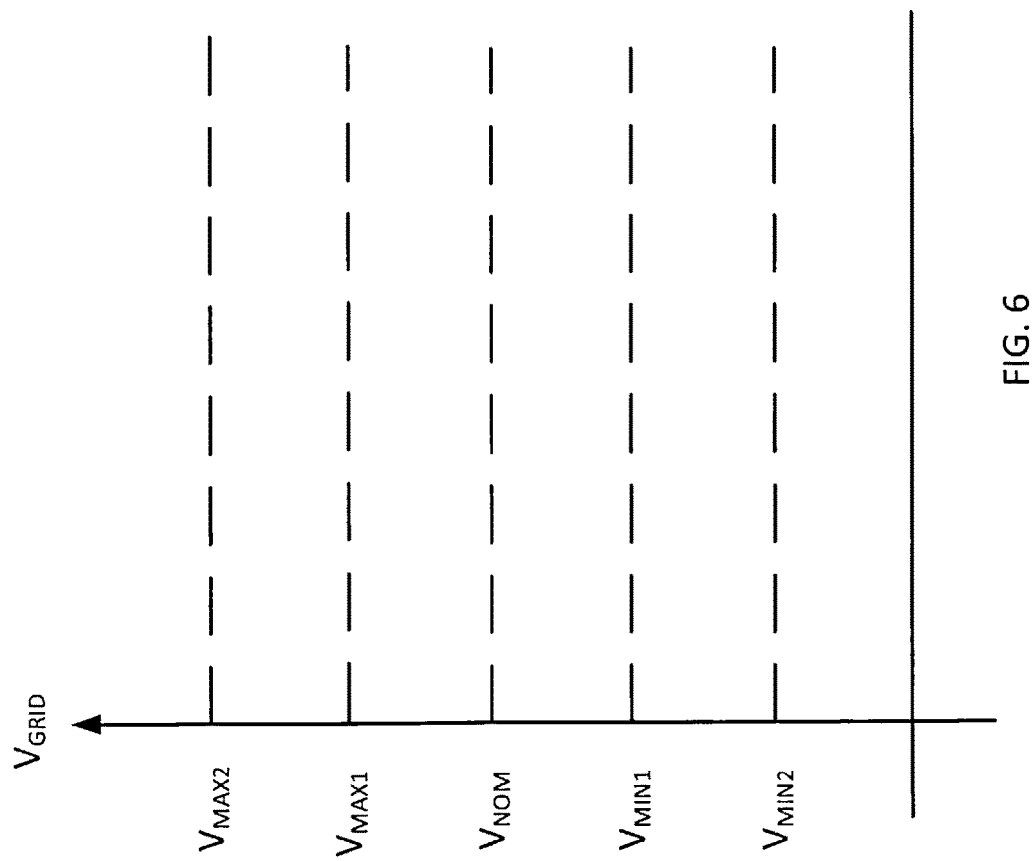
FIG. 6 is a diagram showing an example relationship between different levels of microgrid voltage ($V_{GRID}$).

The value of the microgrid voltage could convey useful information about the state of microgrid connected devices. FIG. 6 is a diagram showing an example relationship between different levels of microgrid voltage. FIG. 6 is for illustrative purposes and is not to scale. In one embodiment $V_{MAX2}=V_{NOM}+10\%$, $V_{MAX1}=V_{NOM}+5\%$, $V_{MIN1}=V_{NOM}5\%$, Loads Microgrid connected loads could also be controlled using voltage semantics. Microgrid connected loads could comprise any of a variety of devices including, for example, lighting, Heating Ventilation and Air Conditioning (HVAC), communications equipment, water heaters, pumps, motors and/or other industrial equipment.

Figure 7:
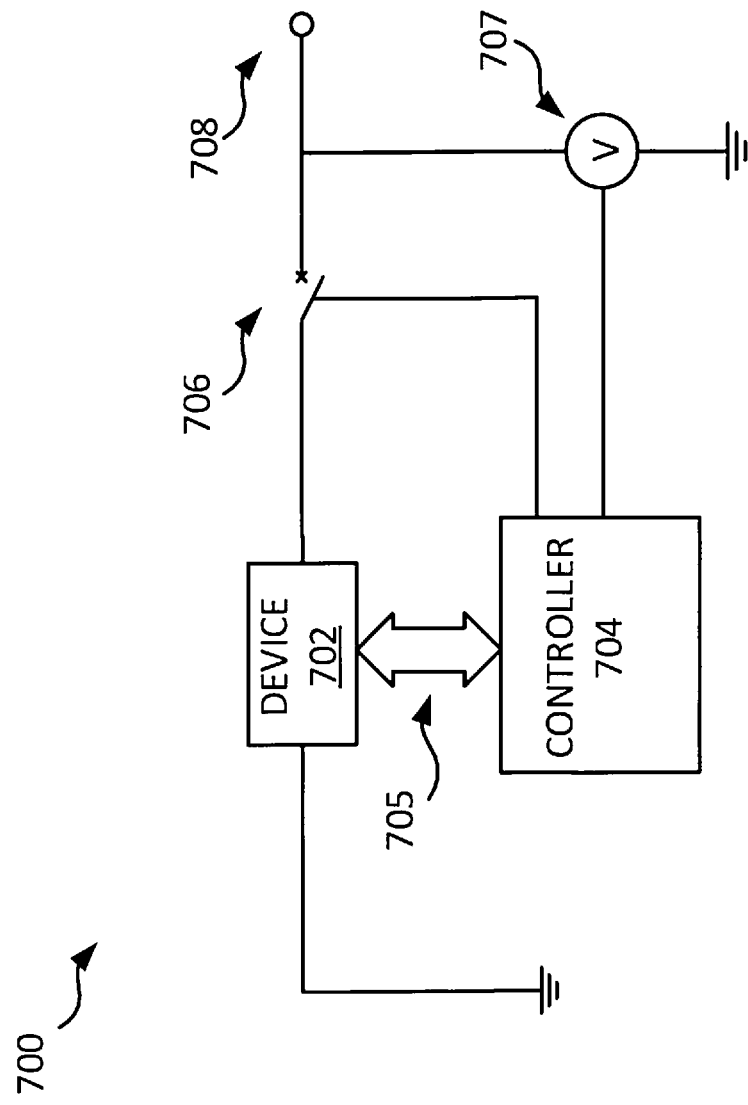
FIG. 7 is block diagram of an example load.

FIG. 7 is block diagram of an example load. Load 700 comprises controller 704, switch 706, load device 702 and a voltage sensor 707 such as a voltmeter. Load 700 connects to the microgrid at terminal 708. Load 700 is activated/deactivated by the closing/opening of switch 706. Microgrid connectivity is controlled by controller 704 through switch 706. Voltage sensor 707 monitors the microgrid voltage. Controller 704 communicates with load device 702 through bi-directional bus 705. Load device 702 might communicate operational parameters to controller 704. If load device 702 were a refrigeration unit or a water heater, for example, it might communicate its internal temperature. If load device 702 were a water pump and storage tank system, for example, it might communicate the water level in the storage tank. FIG. 7 is for example purposes only and other implementations are possible. For example, switch 704 and voltage sensor 707 could be absent in some implementations and these functions could be performed by an intelligent distribution panel to which the load is connected.

Microgrid connected loads could be assigned a priority based on their perceived importance to the microgrid. For example, an entertainment device might be assigned a low priority while medical equipment could be assigned a high priority. Loads could also or instead be classified as storable or non-storable loads. A storable load is a load whose output can be stored. An electric water pump which fills a reservoir, and a hot water heater, are examples of storable loads. The timing of the activation of storable loads could be flexible. For example, so long as the water level in a reservoir is above a minimum value the turn on time of a water pump could be flexible. The output of a non-storable load cannot be stored. An example of a non-storable load would be room lighting. The priority, storability and schedule of load 700 could be stored in a memory device, which could be an internal memory device in controller 704 or an external memory (not shown).

Loads could be controlled based on their priority, storability and/or the state of the microgrid's generators and storage devices. The state of the microgrid's generators and storage could be communicated to the loads by the microgrid voltage, without a dedicated communication channel. Such a microgrid control system could be simpler and more reliable than systems with dedicated communication channels. Referring to FIG. 7, controller 704 could monitor the microgrid voltage through voltage sensor 707 and interpret the state of the microgrid based on this measurement.

For example, referring to Table 1, when $V_{MAX2} > V_{GRID} > V_{MAX1}$ the microgrid's generators are injecting less than their $P_{MPP}$ and the total available power generation capacity of the microgrid exceeds its load and storage requirements. Under this condition, supply exceeds demand and it could be permissible for all loads on the microgrid to be active and connected to the microgrid regardless of their priority. Under this condition it could also be advantageous to connect and activate storage type loads.

When $V_{MAX1} > V_{GRID} > V_{NOM}$ the total available power generation capacity of the microgrid is equal to the load and storage charging requirements and generation and demand are in equilibrium. Under these conditions it could be advantageous for some loads to connect and activate, depending on their priority.

In the situation where $V_{NOM} > V_{GRID} > V_{MIN1}$, the microgrid's generating capacity is not able to meet the load requirement of the microgrid and storage is discharging to support the microgrid. Under this condition, it could be advisable to have certain low priority loads disconnect and deactivate or not be allowed to connect and activate. It could also be advantageous for storage type loads to disconnect and deactivate or not be allowed to connect.

When $V_{GRID} = V_{MIN1}$ the total available power generation and storage generation is equal to load requirements. Under these conditions it could be advantageous for all but the highest priority loads to disconnect and deactivate or not be allowed to connect and activate.

Loads could be assigned a disconnect RMS threshold voltage ($V_{DIS}$) based on their priority. For example, higher priority loads could disconnect at a lower microgrid voltage than lower priority loads. For example an entertainment system might disconnect at microgrid voltage 5% below $V_{NOM}$ while a medical equipment system might not disconnect until a microgrid voltage 9% below of $V_{NOM}$. Loads could also or instead be assigned a reconnect threshold voltage ($V_{CON}$). After a load has disconnected it would not be allowed to reconnect until the microgrid voltage is above the reconnect threshold. Higher priority loads could reconnect at a lower microgrid voltage than lower priority loads.

Figure 8:
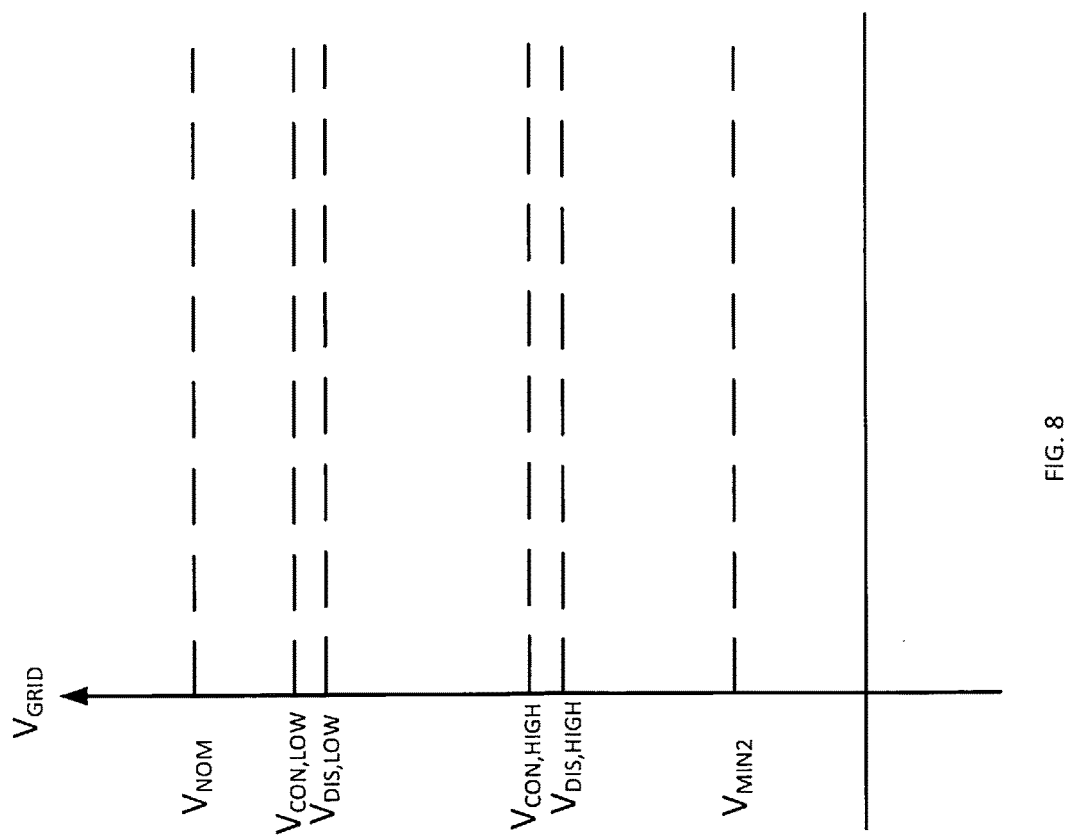
FIG. 8 is a graph of example disconnect and reconnect threshold voltages for two loads of different priority.

FIG. 8 is a graph of example disconnect and reconnect threshold voltages for two loads of different priority. $V_{CON,LOW}$ and $V_{DIS,LOW}$ are connect and disconnect voltages for a low priority load, respectively and $V_{CON,HIGH}$ and $V_{DIS,HIGH}$ are connect and disconnect voltages for a higher priority load, respectively. FIG. 8 is not to scale and is purely for illustrative purposes.

The disconnect and reconnect thresholds of a load could be different and the difference could be a fixed percentage of $V_{NOM}$. This could prevent loads from "chattering" (repeatedly connecting and disconnecting). In one embodiment the difference is 1% of $V_{NOM}$. For example, a load might have a $V_{DIS}$ 5% below $V_{NOM}$ and a $V_{CON}$ 4% below $V_{NOM}$.

Loads could have a disconnect time delay ($T_{DIS}$) and a reconnect time delay ($T_{CON}$). For example, after sensing a microgrid voltage lower than its disconnect threshold, controller 704 of load 700 (FIG. 7) could wait for a time $T_{DIS}$ before it disconnects the load from the microgrid by opening switch 706. Similarly, after sensing a microgrid voltage above its reconnect voltage controller 704 could wait for a time $T_{CON}$ before reconnecting load 700 to the microgrid by closing switch 706.

Higher priority loads could have longer disconnect delays than lower priority loads. This could reduce spurious disconnection of important loads due to voltage transients. The disconnect time delay of a load could be proportional to the difference between the load's disconnect threshold voltages and the nominal microgrid voltage ($V_{NOM}$). For example, the disconnect time could be linearly dependent on the amount the disconnect threshold voltage is below $V_{NOM}$ and given by the equation $$T_{DIS} = T_{0,DIS} \frac{V_{NOM} - V_{DIS}}{V_{NOM} - V_{MIN2}} \qquad (18)$$

where $T_{0,DIS}$ is a constant.

Higher priority loads could also have shorter reconnect delays than lower priority loads. This could reduce the time important loads are disconnected from the microgrid. The reconnect time delay of a load could be proportional to the difference between the load's reconnect threshold voltages and the minimum allowed microgrid voltage ($V_{MIN2}$). For example, the reconnect time could be linearly dependent on the amount the reconnect threshold voltage is above $V_{MIN2}$ and given by the equation $$T_{CON} = T_{0,CON} \frac{V_{CON} - V_{MIN2}}{V_{NOM} - V_{MIN2}} \qquad (19)$$

where $T_{0,CON}$ is a constant.

The disconnect time of a load could always be shorter than its reconnect time. Relatively rapid turn-off of loads could prevent a collapse of the microgrid voltage while relatively slow reconnection of loads could promote microgrid stability. For loads of equal priority disconnect and reconnect delays could be randomized to prevent simultaneous connection or disconnection.

All disconnect and reconnect times could be made longer than a single microgrid cycle to ensure a reliable calculation of the RMS value of the microgrid voltage and to prevent spurious disconnects or reconnects. For example, if the microgrid frequency is 60 Hz a microgrid cycle is 16.67 milliseconds long. This could be the shortest permissible disconnect or reconnect delay. The shortest delay in the microgrid could be the reconnect delay of the highest priority load and it could be at least 16.67 milliseconds.

The maximum values of $T_{DIS}$ and $T_{CON}$ could be determined by how long the microgrid's storage should supply or absorb the difference between generator supply and load demand.

Overview

Various embodiments are described above, with reference to FIGS. 1 to 8.

More generally, a method according to an aspect of the present disclosure relates to generator control. FIG. 9 is a flow diagram illustrating an example method. The example method 900 involves monitoring microgrid-side voltage at a microgrid side of an electrical power source in an electrical microgrid, at 902. FIG. 9 is an example in which the electrical power source includes an electrical generator and a power converter coupled to the electrical generator at the microgrid side of the electrical generator, as shown in FIG. 2E, for instance.

At 904, generator-side voltage at an electrical generator side of the power converter of the electrical power source is monitored. At 906, FIG. 9 illustrates an operation of varying power flow between the microgrid and the electrical power source. This is accomplished in an embodiment by controlling the power converter to synthesize, in a voltage source and resistance model of the electrical power source such as shown in FIG. 2A, a constant voltage $V_{GEN}$ of the voltage source 202 and a variable value of the resistance 204. The constant voltage $V_{GEN}$ is the maximum allowable voltage $V_{MAX}$ of the electrical microgrid in an embodiment.

The electrical generator has a variable maximum available output power. Controlling the power converter to vary power flow at 906 could involve controlling the value of the resistance 204 to deliver the maximum available generator output power to the electrical microgrid over a range of microgrid voltages up to a first voltage $V_{MAX1}$ below a maximum allowable voltage $V_{MAX}$ of the electrical microgrid.

Equation 3A above provides an example of a formula according to which the resistance value of the resistance 204 could be varied in order to vary power flow at 906.

As noted above in the context of Equation (4), once the resistance value of the resistance 204 reaches a lower limit, the power delivered to the microgrid is no longer constant and RMS power delivered to the microgrid has a quadratic dependence on microgrid voltage. Thus, in an embodiment, controlling the power converter to vary power flow at 906 could also involve controlling the power converter to provide power output to the electrical microgrid that monotonically decreases with microgrid voltage to zero power output at the voltage $V_{MAX}$, as shown in FIG. 2D, for example.

FIG. 10 is a flow diagram illustrating another example method, which relates to control of an electrical storage appliance. In the example method 1000, microgrid-side voltage at a microgrid side of an electrical power source in an electrical microgrid is monitored at 1002. The electrical power source includes an electrical energy storage device and a power converter coupled to the electrical energy storage device at the microgrid side of the electrical energy storage device. The example method also involves monitoring voltage at an electrical energy storage device side of the power converter of the electrical power source at 1004, and controlling power flow between the microgrid and the electrical power source at 1006. The power flow is controlled at 1006 by controlling the power converter to synthesize, in a voltage source and resistance model of the electrical power source such as shown in FIG. 3, a resistance value of the resistance 304 that is dependent upon a phase angle between the voltage $V_{STOR}$ at the microgrid side of the electrical power source and current of the electrical power source.

The controlling at 1006 could involve controlling the power converter to synthesize the resistance value as $R_{STOR}$:

$$R_{STOR} = \frac{V_{MIN2}\cos\phi}{P_{S,MAX}}\left[\begin{array}{c} V_{MIN2}^2 + V_{MIN1}^2 - \\ 2V_{MIN1}V_{MIN2}\{\cos(\phi)\sqrt{1-K'''^2\sin^2\phi} + K'''\sin^2(\phi)\} \end{array}\right]^{1/2}$$

as noted above.

For a purely resistive microgrid, controlling the power converter could involve controlling the power converter to synthesize the resistance value as $R_{STOR}$ in accordance with Equation (8).

In the foregoing description of FIG. 3, it is noted that in one embodiment, the electrical storage appliance modeled by the control model 300 can only supply power to the microgrid when $V_{GRID} < V_{NOM}$ and can only draw power when $V_{GRID} > V_{NOM}$. Thus, power flow control at 1006 could involve controlling the power converter to control a voltage of the voltage source differently depending on whether the electrical energy storage device is to charge or discharge. The voltage of the voltage source could be controlled so that power is supplied from the electrical energy storage device to the electrical microgrid when a voltage of the electrical microgrid $V_{GRID}$ is less than a nominal voltage $V_{NOM}$, and power is supplied to the electrical energy storage device from the electrical microgrid when $V_{GRID} > V_{NOM}$, for example. $V_{GRID}$ could thereby provide an output power status of the electrical energy storage device.

Power flow control at 1006 could also or instead involve controlling the power converter to control the voltage of the voltage source 302 (FIG. 3) based on a state of charge of the electrical energy storage device such as the DC battery 402 in FIG. 4, with a dependence of the voltage of the voltage source monotonically increasing with the state of charge between an upper limit and a lower limit.

As noted above in the context of Equation (10), after the $P_{S,MAX}$ limit is reached, $V_{STOR}$ tracks the microgrid voltage downwards to maintain $P_{STOR}$ at $P_{S,MAX}$. Thus, power flow control at 1006 could involve controlling the power converter to control a voltage of the voltage source 302 to track the voltage at the microgrid side of the electrical power source after a maximum value of output power from the electrical energy storage device is reached.

It could be desirable to limit the output power of an electrical storage appliance when its SoC is at or near $SoC_L$ as noted above, and accordingly power flow control at 1006 could involve controlling the power converter to control the voltage of the voltage source based on a state of charge of the electrical energy storage device, with a dependence of power output from the electrical energy storage device to the electrical microgrid monotonically increasing with the state of charge.

The state of charge of the electrical energy storage device could also be monitored in some embodiments. Controlling the power converter could then involve controlling the power converter to synthesize the resistance value of the resistance 304 dependent upon the phase angle while the state of charge is above a threshold state of charge, and controlling the power converter to decrease power output from the electrical energy storage device to the electrical microgrid by increasing the resistance value of the resistance when the state of charge is at or below the threshold state of charge. This could allow $P_{S,MAX}$ to be at or close to its nominal value at SoC values near $SoC_U$ and assume a reduced value at values of SoC near $SoC_L$.

As noted above, some types of electrical storage devices are best charged at a very slow rate to maximize their lifetime while others are best charged at a very rapid rate. Some are best charged only when their SoC is close to zero and should therefore be controlled to charge more rapidly at a low SoC than at a high SoC. Other types should be controlled to charge more rapidly at a higher value of SoC to help prevent their SoC dropping below a certain value. Power flow control at 1006 could provide for such charging control by controlling the power converter to control charging of the electrical energy storage device by controlling a voltage of the voltage source 302 to be below a voltage of the electrical microgrid.

Equation (15) is an example of a formula in accordance with which the voltage of the voltage source could be controlled to be below the voltage of the electrical microgrid.

Power flow could be controlled at 1006 to provide zero power flow between the electrical energy storage device and the electrical microgrid by controlling a voltage of the voltage source to track a voltage of the electrical microgrid. When the target power inflow ($P_{TAR}$) in Equation (15) is zero, $V_{STOR}=V_{GRID}$ and $V_{STOR}$ mirrors the microgrid voltage, resulting in no power flow and no charging of the storage device.

There could be a lower limit on $V_{STOR}$, in which case controlling the power converter for power flow control at 1006 could involve controlling charging of the electrical energy storage device by controlling the voltage of the voltage source to be below the voltage of the electrical microgrid but above a minimum voltage.

In a similar manner, for storage discharging the power converter could be controlled to control a power output of the electrical power source by controlling the voltage of the voltage source 302 to be above a minimum voltage and above a voltage of the electrical microgrid.

An electrical storage appliance will switch modes between charging and discharging, when the microgrid voltage crosses a threshold value for example. As noted above, it could be beneficial to have a charge to discharge transition delay shorter than the discharge to charge delay. More generally, a method could include controlling the power converter to provide asymmetric transition times for the electrical energy storage device to transition from charging to discharging and to transition from discharging to charging.

Voltage semantics relating to state information that could be inferable from microgrid voltage are described herein. In an embodiment, a method further includes detecting a power oversupply condition in the electrical microgrid where the monitored voltage at the microgrid side of the electrical power source is above a threshold. Power flow control at 1006 could then involve controlling the electrical energy storage device to store electrical energy from the electrical microgrid responsive to detecting the power oversupply condition.

FIG. 11 is a flow diagram illustrating a further example method. The example methods in FIGS. 9 and 10 relate to generator and storage control, respectively, and FIG. 11 relates to control at a microgrid level. Although shown in FIG. 11 as a single flow diagram, the example method 1100 is a distributed control method that does not require a central controller. Operations in the example method 1100 could be performed at local controllers that are implemented at electrical power sources. Other operations disclosed herein could similarly be performed at load controllers.

The example method 1100 involves, at 1102, monitoring microgrid-side voltages at a microgrid side of electrical power sources in an electrical microgrid. Each of the electrical power sources includes a power source device and a power converter coupled to the power source device at the microgrid side of the electrical power source. The example method 1100 also includes monitoring voltages at a power source device side of the power converter of each of the electrical power sources at 1104, and controlling power flow between the microgrid and each of the electrical power sources by controlling the power converters.

For an electrical power source that includes an electrical generator as the power source device, the controlling at 1106 involves controlling the power converter of the electrical power source to maintain, in a voltage source and resistance model of the electrical power source such as shown in FIG. 2A, a constant voltage of the voltage source. For an electrical power source that includes an electrical energy storage device as the power source device, the controlling at 1106 involves controlling the power converter of the electrical power source to synthesize, in a voltage source and resistance model of the electrical power source, a resistance value of the resistance that is dependent upon a phase angle between the voltage at the microgrid side of the electrical power source and current of the electrical power source.

Although not explicitly shown in FIG. 11, a method could also involve load control. Loads in an electrical migrogrid could be controlled based on one or more of: priorities respectively associated with the loads, storability of the loads, and states of the electrical power sources.

A method could also involve monitoring voltage of the electrical microgrid at the loads. Various state information is inferable from microgrid voltage, as noted above in the context of voltage semantics, and thus a method could also involve determining, at the loads, the states of the electrical power sources based on the voltage. These operations could be performed by a load controller such as the controller 704 in FIG. 7.

For example, microgrid voltage above a threshold could be indicative of a power oversupply condition, and therefore a method could involve detecting a power oversupply condition in the electrical microgrid where the monitored voltages are above a threshold. Such a condition could be detected not only by load controllers, but also or instead by power source controllers. In the case of loads, the loads could be started on the electrical microgrid responsive to detecting the power oversupply condition.

A generation to storage charging and load equilibrium condition could be detected in the electrical microgrid where the monitored voltages are above a lower threshold and below an upper threshold.

Another detectable condition is a storage discharge condition in the electrical microgrid where the monitored voltages decrease below a threshold.

Other example conditions are set out in Table 1 above.

When storage is discharging, generation is unable to meet load demand. A load could be controlled to deactivate the load or to prevent the load from starting on the electrical microgrid responsive to detecting the storage discharge condition.

Controlling loads could involve controlling the loads based on the voltage of the electrical microgrid. Loads could be disconnected from the electrical microgrid following respective disconnect time delays for each load after the voltage of the electrical microgrid decreases to respective disconnect threshold voltages for the loads. Load control could also or instead involve controlling the loads to connect or reconnect to the electrical microgrid following a respective connect or reconnect time delay for the load after the voltage of the electrical microgrid increases to a respective connect or reconnect threshold voltage for the load.

The disconnect time delay for each load could be proportional to a difference between the disconnect threshold voltage of the load and a nominal operating voltage of the electrical microgrid.

The connect time delay for a first load that has a higher priority than a second load could be shorter than the connect time delay for the second load.

The connect time delay for each load could be proportional to a difference between the connect threshold voltage of the load and a minimum operating voltage of the electrical microgrid.

Disconnect time delays and reconnect time delays could be based on the priorities respectively associated with the loads. In an embodiment, a method also involves randomizing the disconnect time delays and the reconnect time delays for loads of equal priority.

Variations of the example methods 900, 1000, 1100 may be or become apparent. A method could include additional operations that have not been shown in the drawings, and examples of such additional operations are disclosed herein. In general, other embodiments could include additional, fewer, and/or different operations performed in an order similar to or different from that shown in FIGS. 9 to 11.

The foregoing Overview describes example methods. It should be appreciated that apparatus embodiments are also contemplated. An electrical power source, for example, could include: a power source device; a power converter coupled to the power source device and to be coupled to an electrical microgrid; a controller, coupled to the power converter, to control power output to the microgrid through control of the power converter. The controller includes circuitry that is adapted or configured to control a power converter in accordance with any of the power source techniques disclosed herein. A controller for a generator and a controller for storage are configured differently, to implement the different disclosed generator and storage control techniques. Load controllers may also be involved in microgrid control, and a load controller similarly includes circuitry that is adapted or configured to control a load in accordance with any of the disclosed load control techniques.

The electronic devices disclosed above are examples of such circuitry.

CONCLUSION

What has been described is merely illustrative of the application of principles of embodiments of the present disclosure. Other arrangements and methods can be implemented by those skilled in the art.

For example, any divisions of function in the drawings are not intended to be limiting or exhaustive. Other embodiments could include additional, fewer, and/or different components than shown.

Also, although described primarily in the context of methods and systems, other implementations are also contemplated, as instructions stored on a non-transitory computer-readable medium, for example.

SYMBOL GLOSSARY

| | |
|---|---|
| $I_{GEN}$ | RMS Generator current |
| $I_{GEN}^*$ | Instantaneous Generator current |
| $I_{STOR}$ | RMS Storage current |
| $P_{GEN}$ | RMS Generator power output to the microgrid |
| $P_{STOR}$ | RMS Storage power output to the microgrid |
| $P_{S,MAX}$ | Maximum RMS storage output power |
| $P_{MAX}$ | Maximum RMS generator real output power |
| $P_{MPP}$ | Maximum available RMS generator output power |
| $R_{STOR}$ | Synthesized storage device resistance |
| $R_{GEN}$ | Synthesized generator resistance |
| $S_{MAX}$ | Maximum RMS generator apparent output power |
| SoC | State of charge of storage |
| $SoC_L$ | Lower limit on state of charge of storage |
| $SoC_U$ | Upper limit on state of charge of storage |
| $SoC_T$ | A threshold value of SoC after which $P_{S,MAX}$ decreases with SoC |
| $SoC_{MAX}$ | Value of SoC equal to and above which storage is at $P_{S,MAX}$ |
| $T_{CON}$ | Load reconnect time delay |
| $T_{DIS}$ | Load disconnect delay time |
| $V_{GRID}^*$ | Instantaneous microgrid voltage |
| $V_{GRID}$ | RMS Microgrid voltage |
| $V_{GEN}$ | RMS synthesized generator source voltage |
| $V_{GEN}^*$ | Instantaneous synthesized generator source voltage |
| $V_{STOR}$ | Synthesized storage source voltage |
| $V_{MAX}$ | Maximum microgrid operating voltage |
| $V_{MAX2}$ | An upper microgrid voltage threshold |
| $V_{MAX1}$ | An upper microgrid voltage threshold between $V_{MAX2}$ and $V_{NOM}$ |
| $V_{NOM}$ | Nominal microgrid operating voltage |
| $V_{MIN1}$ | A lower microgrid voltage threshold between $V_{NOM}$ and $V_{MIN2}$ |
| $V_{MIN2}$ | A lower microgrid voltage threshold lower than $V_{MIN1}$ |
| $V_{DIS}$ | Load Disconnect Threshold Voltage |
| $V_{CON}$ | Load Reconnect Threshold Voltage |

What is claimed is:

1. A method comprising:

monitoring voltage at a microgrid side of an electrical power source at which the electrical power source is connected to an electrical microgrid, the electrical power source comprising a Direct Current (DC) electrical generator and a power converter coupled to the DC electrical generator at the microgrid side of the DC electrical generator, the DC electrical generator having a variable maximum available output power;

varying power flow between the microgrid and the electrical power source by controlling the power converter to produce, in a voltage source and resistance model of the electrical power source, a constant voltage of the voltage source and a variable value of the resistance, controlling the power converter comprising controlling the value of the resistance to deliver the maximum available output power to the electrical microgrid over a range of microgrid voltages up to a first voltage $V_{MAX1}$ below a maximum allowable voltage $V_{MAX}$ of the electrical microgrid, controlling the power converter further comprising controlling the power converter to provide power output to the electrical microgrid by varying the resistance value of the resistance according to $$R_{GEN} = \frac{V_{GRID}\cos\emptyset}{P_{MPP}} \left[ V_{MAX}^2 + V_{GRID}^2 - 2V_{GRID}V_{MAX}\{\cos(\emptyset)\sqrt{1-K'^2\sin^2\emptyset} + K'\sin^2(\emptyset)\} \right]^{1/2}$$

where
$R_{GEN}$ is the resistance value;
$V_{GRID}$ is a voltage of the electrical microgrid;
Ø is a phase angle between the voltage at the microgrid side of the electrical power source and output current of the electrical power source;
$P_{MPP}$ is the maximum available output power from the electrical generator to the electrical microgrid;
$V_{MAX}$ is also the constant voltage of the voltage source;

$K'=V_{GRID}/V_{MAX}$.

2. The method of claim 1, controlling the power converter further comprising controlling the power converter to provide power output to the electrical microgrid that monotonically decreases with microgrid voltage to zero power output at the voltage $V_{MAX}$.

3. A method comprising:
monitoring voltage at a microgrid side of an electrical power source at which the electrical power source is connected to an electrical microgrid, the electrical power source comprising a Direct Current (DC) electrical energy storage device and a power converter coupled to the DC electrical energy storage device at the microgrid side of the DC electrical energy storage device;
controlling power flow between the microgrid and the electrical power source by controlling the power converter to produce, in a voltage source and resistance model of the electrical power source, a resistance value of the resistance that is dependent upon a phase angle between the voltage at the microgrid side of the electrical power source and current of the electrical power source,
controlling the power converter comprising controlling the power converter to produce the resistance value as $R_{STOR}$:

$$R_{STOR} = \frac{V_{MIN2}\cos\emptyset}{P_{S,MAX}} \left[ V_{MIN2}^2 + V_{MIN1}^2 - 2V_{MIN1}V_{MIN2}\{\cos(\emptyset)\sqrt{1-K'''^2\sin^2\emptyset} + K'''\sin^2(\emptyset)\} \right]^{1/2}$$

where
$V_{MIN1}$ and $V_{MIN2}$ are threshold operating voltages of the electrical microgrid and are less than a nominal operating voltage of the electrical microgrid and $V_{MIN1}>V_{MIN2}$;
Ø is the phase angle between the voltage at the microgrid side of the electrical power source and current of the electrical power source;
$P_{S,MAX}$ is maximum real output power of the electrical energy storage device:

$K'''=V_{MIN2}/V_{MIN1}$.

4. The method of claim 3, controlling the power converter further comprising controlling the power converter to produce, for a purely resistive microgrid, the resistance value as $R_{STOR}$:

$$R_{STOR} = \frac{V_{MIN2} \cdot V_{MIN1} - V_{MIN2}^2}{P_{S,MAX}}.$$

5. The method of claim 3, controlling the power converter further comprising controlling a voltage of the voltage source differently depending on whether the electrical energy storage device is to charge or discharge.

6. The method of claim 5, controlling the voltage of the voltage source comprising controlling the voltage of the voltage source so that power is supplied from the electrical energy storage device to the electrical microgrid when a voltage of the electrical microgrid $V_{GRID}$ is less than a nominal voltage $V_{NOM}$, and power is supplied to the electrical energy storage device from the electrical microgrid when $V_{GRID}$ $V_{NOM}$.

7. The method of claim 6, whereby $V_{GRID}$ provides an output power status of the electrical energy storage device.

8. The method of claim 5, controlling the voltage of the voltage source comprising controlling the voltage of the voltage source based on a state of charge of the electrical energy storage device, with a dependence of the voltage of the voltage source monotonically increasing with the state of charge between an upper limit and a lower limit.

9. The method of claim 3, controlling the power converter further comprising controlling a voltage of the voltage source to track the voltage at the microgrid side of the electrical power source after a maximum value of output power from the electrical energy storage device is reached.

10. The method of claim 3, controlling the power converter further comprising controlling the voltage of the voltage source based on a state of charge of the electrical energy storage device, with a dependence of power output from the electrical energy storage device to the electrical microgrid monotonically increasing with the state of charge.

11. The method of claim 3, further comprising:
monitoring a state of charge of the electrical energy storage device,
controlling the power converter further comprising controlling the power converter to produce the resistance value of the resistance dependent upon the phase angle while the state of charge is above a threshold state of charge, and controlling the power converter to decrease power output from the electrical energy storage device to the electrical microgrid by increasing the resistance value of the resistance when the state of charge is at or below the threshold state of charge.

12. The method of claim 3, controlling the power converter further comprising providing zero power flow between the electrical energy storage device and the electrical microgrid by controlling a voltage of the voltage source to track a voltage of the electrical microgrid.

13. The method of claim 3, controlling the power converter further comprising controlling a power output of the electrical power source by controlling the voltage of the voltage source to be above a minimum voltage and above a voltage of the electrical microgrid.

14. The method of claim 3, controlling the power converter further comprising controlling the power converter to provide asymmetric transition times for the electrical energy storage device to transition from charging to discharging and to transition from discharging to charging.

15. The method of claim 3, further comprising:
detecting a power oversupply condition in the electrical microgrid where the monitored voltage at the microgrid side of the electrical power source is above a threshold,
controlling power flow further comprising controlling the electrical energy storage device to store electrical energy from the electrical microgrid responsive to detecting the power oversupply condition.

16. A method comprising:
monitoring voltage at a microgrid side of an electrical power source at which the electrical power source is connected to an electrical microgrid, the electrical power source comprising a Direct Current (DC) electrical energy storage device and a power converter coupled to the DC electrical energy storage device at the microgrid side of the DC electrical energy storage device:
controlling power flow between the microgrid and the electrical power source by controlling the power converter to produce, in a voltage source and resistance model of the electrical power source, a resistance value of the resistance that is dependent upon a phase angle between the voltage at the microgrid side of the electrical power source and current of the electrical power source,
controlling the power converter comprising controlling charging of the electrical energy storage device by controlling a voltage of the voltage source to be below a voltage of the electrical microgrid,
controlling the power converter further comprising controlling the voltage of the voltage source to be below the voltage of the electrical microgrid according to $$V_{STOR} = \frac{P_{TAR} \cdot R_{STOR} + V_{GRID}^2}{V_{GRID}}$$

where
$V_{STOR}$ is the voltage of the voltage source;
$P_{TAR}$ is target charging power, and negative for charging;
$R_{STOR}$ is an resistance value of the resistance;
$V_{GRID}$ is the voltage of the electrical microgrid.

17. The method of claim 16, controlling the power converter further comprising controlling charging of the electrical energy storage device by controlling the voltage of the voltage source to be below the voltage of the electrical microgrid but above a minimum voltage.

18. A method comprising:
monitoring voltages at a microgrid side of a plurality of electrical power sources at which the electrical power sources are connected to an electrical microgrid, each of the electrical power sources comprising a Direct Current (DC) power source device and a power converter coupled to the DC power source device at the microgrid side of the DC power source device;
controlling power flow between the microgrid and each of the electrical power sources by controlling the power converters,
the controlling comprising, for an electrical power source that comprises an electrical generator as the power source device, controlling the power converter of the electrical power source to maintain, in a voltage source and resistance model of the electrical power source, a constant voltage of the voltage source,
the controlling comprising, for an electrical power source that comprises an electrical energy storage device as the power source device, controlling the power converter of the electrical power source to produce, in a voltage source and resistance model of the electrical power source, a resistance value of the resistance that is dependent upon a phase angle between the voltage at the microgrid side of the electrical power source and current of the electrical power source,
controlling the power converter comprising controlling the power converter to produce the resistance value as $R_{STOR}$:

$$R_{STOR} = \frac{V_{MIN2}\cos\emptyset}{P_{S,MAX}}\Big[V_{MIN2}^2 + V_{MIN1}^2,$$
$$-2V_{MIN1}V_{MIN2}\big\{\cos(\emptyset)\sqrt{1 - K'''^2\sin^2\emptyset} + K'''\sin^2(\emptyset)\big\}\Big]^{1/2}$$

where
$V_{MIN1}$ and $V_{MIN2}$ are threshold operating voltages of the electrical microgrid and are less than a nominal operating voltage of the electrical microgrid and $V_{MIN1} > V_{MIN2}$;
$\emptyset$ is the phase angle between the voltage at the microgrid side of the electrical power source and current of the electrical power source;
$P_{S,MAX}$ is maximum real output power of the electrical energy storage device;

$$K''' = V_{MIN2}/V_{MIN1}.$$

19. The method of claim 18, further comprising:
controlling loads in the electrical microgrid based on one or more of: priorities respectively associated with the loads, storability of the loads, and states of the electrical power sources.

20. The method of claim 19, further comprising:
monitoring voltage of the electrical microgrid at the loads;
determining, at the loads, the states of the electrical power sources based on the voltage.

21. The method of claim 20, further comprising:
detecting a power oversupply condition in the electrical microgrid where the monitored voltages are above a threshold.

22. The method of claim 21, further comprising:
starting the loads on the electrical microgrid responsive to detecting the power oversupply condition.

23. The method of claim 20, further comprising:
detecting a generation to storage charging and load equilibrium condition in the electrical microgrid where the monitored voltages are above a lower threshold and below an upper threshold.

24. The method of claim 20, further comprising:
detecting a storage discharge condition in the electrical microgrid where the monitored voltages decrease below a threshold.

25. The method of claim 24, further comprising:
controlling a load to deactivate the load or to prevent the load from starting on the electrical microgrid responsive to detecting the storage discharge condition.

26. The method of claim 20,
controlling loads comprising controlling the loads based on the voltage of the electrical microgrid, to disconnect each load from the electrical microgrid following a respective disconnect time delay for the load after the voltage of the electrical microgrid decreases to a respective disconnect threshold voltage for the load, the disconnect time delay for each load being proportional to a difference between the disconnect threshold voltage of the load and a nominal operating voltage of the electrical microgrid.

27. The method of claim 20, controlling loads comprising controlling the loads based on the voltage of the electrical microgrid, to connect each load to the electrical microgrid following a respective connect time delay for the load after the voltage of the electrical microgrid increases to a respective connect threshold voltage for the load, the connect time delay for a first load that has a higher priority than a second load being shorter than the connect time delay for the second load.

28. The method of claim 20, controlling loads comprising controlling the loads based on the voltage of the electrical microgrid, to connect each load to the electrical microgrid following a respective connect time delay for the load after the voltage of the electrical microgrid increases to a respective connect threshold voltage for the load, the connect time delay for each load being proportional to a difference between the connect threshold voltage of the load and a minimum operating voltage of the electrical microgrid.

29. The method of claim 20, controlling loads comprising controlling the loads based on the voltage of the electrical microgrid, to disconnect each load from the electrical microgrid following a respective disconnect time delay for the load after the voltage of the electrical microgrid decreases to a respective disconnect threshold voltage for the load, and to reconnect each load to the electrical microgrid following a respective reconnect time delay for the load after the voltage of the electrical microgrid increases to a respective reconnect threshold voltage for the load, the disconnect time delays and the reconnect time delays being based on the priorities respectively associated with the loads, the method further comprising randomizing the disconnect time delays and the reconnect time delays for loads of equal priority.

* * * * *

UNITED STATES PATENT AND TRADEMARK OFFICE
CERTIFICATE OF CORRECTION

PATENT NO. : 9,812,863 B2
APPLICATION NO. : 14/574827
DATED : November 7, 2017
INVENTOR(S) : James B. Bacque, Raymond Kenneth Orr and Edward P. Keyes It is certified that error appears in the above-identified patent and that said Letters Patent is hereby corrected as shown below:

In the Specification

In Column 19, Line 8, "where K'''= $V_{MIN2}N_{MIN1}$" should read --where K''' = $V_{MIN2} / V_{MIN1}$--.

In Column 19, equation (10), "(·P) $_{S,MAX}$" should read --$P_{S,MAX}$--.

In the Claims

In Claim 6, Column 34, Line 22, "$V_{GRID}V_{NOM}$" should read --$V_{GRID} > V_{NOM}$--.

In Claim 18, Column 36, Line 15, "$V^2_{MIN}$," should read --$V^2_{MIN}$--.

Signed and Sealed this
Third Day of April, 2018

Andrei Iancu
*Director of the United States Patent and Trademark Office*